(12) United States Patent  
Lu

(10) Patent No.: US 8,623,273 B2
(45) Date of Patent: Jan. 7, 2014

(54) METHODS FOR PREVENTION AND REDUCTION OF SCALE FORMATION

(75) Inventor: Jie Lu, Lompoc, CA (US)

(73) Assignee: Imerys Filtration Minerals, Inc., San Jose, CA (US)

(*) Notice: Subject to any disclaimer, the term of this patent is extended or adjusted under 35 U.S.C. 154(b) by 462 days.

(21) Appl. No.: 12/995,021

(22) PCT Filed: Jun. 1, 2009

(86) PCT No.: PCT/US2009/045874
§ 371 (c)(1),
(2), (4) Date: Dec. 3, 2010

(87) PCT Pub. No.: WO2009/149024
PCT Pub. Date: Dec. 10, 2009

(65) Prior Publication Data
US 2011/0089115 A1  Apr. 21, 2011

Related U.S. Application Data

(60) Provisional application No. 61/171,126, filed on Apr. 21, 2009, provisional application No. 61/057,934, filed on Jun. 2, 2008.

(51) Int. Cl.
C09K 13/00 (2006.01)
A61L 9/01 (2006.01)
B08B 7/00 (2006.01)
B08B 17/00 (2006.01)
C23F 11/00 (2006.01)

(52) U.S. Cl.
USPC ............ 422/6; 422/1; 422/7; 422/14; 422/40; 134/6; 424/76.8; 252/79.1; 252/175; 252/387

(58) Field of Classification Search
USPC ............. 422/1, 6–7, 14, 40; 134/6; 424/76.8; 252/79.1, 175, 387
See application file for complete search history.

(56) References Cited

U.S. PATENT DOCUMENTS

| | | | |
|---|---|---|---|
| 1,399,845 | A | 12/1921 | Bull |
| 2,979,442 | A | 4/1961 | Badger |
| 3,340,159 | A | 9/1967 | Tidball et al. |
| 3,399,975 | A | 9/1968 | Otten |
| 3,974,039 | A | 8/1976 | Fröhner et al. |
| 4,302,328 | A | 11/1981 | Van Note |
| 4,370,858 | A | 2/1983 | Awerbuch et al. |

(Continued)

FOREIGN PATENT DOCUMENTS

| EP | 0 916 622 A1 | 5/1999 |
|---|---|---|
| WO | WO 84/02126 | 6/1984 |
| WO | WO 2009/149024 A1 | 12/2009 |

OTHER PUBLICATIONS

International Search Report and Written Opinion from International Application No. PCT/US2009/045874 dated Jul. 23, 2009.

*Primary Examiner* — Monzer R Chorbaji
(74) *Attorney, Agent, or Firm* — Finnegan, Henderson, Farabow, Garrett & Dunner, L.L.P.

(57) ABSTRACT

Disclosed herein are methods of preventing or reducing scale formation or corrosion by combining at least one scale-forming fluid comprising at least one scaling compound with at least one anti-scale material chosen from at least one scale-adsorbent agent. The methods may reduce or prevent the formation of scale on surfaces of liquid-related process equipment, such as boilers and heat exchangers.

50 Claims, 18 Drawing Sheets

(56) References Cited

U.S. PATENT DOCUMENTS

| | | |
|---|---|---|
| 4,429,535 A | 2/1984 | Featherstone |
| 4,713,177 A | 12/1987 | Atwood et al. |
| 4,765,912 A | 8/1988 | Totten |
| 4,995,986 A | 2/1991 | Mohn |
| 6,365,101 B1 * | 4/2002 | Nguyen et al. ............... 422/13 |
| 6,929,749 B2 | 8/2005 | Duke et al. |
| 7,122,148 B2 | 10/2006 | Duke et al. |
| 2006/0272816 A1 | 12/2006 | Willberg et al. |

* cited by examiner

METHODS FOR PREVENTION AND REDUCTION OF SCALE FORMATION

INCORPORATION BY REFERENCE/CLAIM OF PRIORITY

This application is a U.S. national stage entry under 35 U.S.C. §371 from PCT International Application No. PCT/US2009/045874, filed Jun. 1, 2009, and claims priority to and the benefit of the filing date of U.S. Provisional Application No. 61/057,934, filed Jun. 2, 2008, and U.S. Provisional Application No. 61/171,126, filed Apr. 21, 2009, the subject matter of all of which is incorporated herein by reference.

FIELD OF THE INVENTION

Disclosed herein are methods of preventing or reducing scale formation or corrosion by combining a scale-forming fluid with at least one anti-scale agent chosen from at least one scale-adsorbent agent. Also disclosed herein are methods of preventing or reducing scale formation or corrosion by which at least one scale-adsorbent agent adsorbs scale crystals present in at least one scale-forming fluid, followed by dispersing the scale crystals.

BACKGROUND OF THE INVENTION

Scaling or scale formation generally involves the precipitation and deposition of dense materials on surfaces made of metal and other materials. Scale formation may occur when inorganic mineral salts (such as, for example, calcium carbonates, calcium sulfates, calcium oxalates, and barium sulfates) precipitate from liquids and deposit on the inside surfaces of a system (such as, for example, boilers, evaporators, reactors, cooling water systems, heat exchangers, pipes, filter cloths, reverse osmosis membrane surfaces, oil wells, and desalination evaporators).

Scale formation may cause a number of operational problems, including but not limited to, plugging of equipment, pressure loss, increased utility costs, reduced heat exchange capacity, corrosion, lost production due to downtime, and downgraded products from insufficient feeds. Scaling of equipment may occur in a variety of industries, for example, in paper pulp manufacture, in the chemical or petrochemical industry, in power generation, in water treatment, and in liquor production. For example, in paper pulp manufacturing processes, even though purified water, such as water purified by reverse osmosis, may be used, calcium and barium salts may leach from wood pulp into the processing water. Since sulfuric acid and aluminum sulfate are also used in the paper making processes, sulfate ions may combine with calcium and barium ions to form calcium sulfate and barium sulfate, which generally tend to deposit as scale on the surfaces of the processing equipment. Calcium oxalate scale is also frequently encountered in oxidative bleaching stages, as well as in paper mills that use recycled fiber. Oxalic acid and oxalate ions originate from wood or are formed through oxidative bleaching of carbohydrate and lignin. Oxalic acid is also a metabolic by-product of fungi, typically found in unbleached secondary brown fiber.

With the implementation of elemental chlorine free (ECF) bleaching, many kraft pulp mills encounter even more serious scale-related problems. Four of the most troublesome and frequently encountered scales formed in the ECF bleaching processes are calcium carbonate, calcium oxalate, calcium sulfate, and barium sulfate. Calcium oxalate may often deposit during acidic bleaching stages, and sometimes deposit with calcium sulfate and barium sulfate. At alkaline pH, calcium carbonate and calcium oxalate scales frequently form.

Since pulp is typically the main source of calcium and barium ions, there is no shortage of scale-forming species in an ECF bleach plant, even when purified water is used. The presence of scale-forming species, the abrupt pH changes, temperature shocks, intense mechanical and hydrodynamic shear forces, sudden pressure drops, non-uniform substrate surfaces can all contribute to scale formation, among other reasons.

As another example, in the petroleum industry scale deposition costs millions of dollars each year and is generally thought to be the leading cause in production decline worldwide. Scale can be deposited in various equipment along various water paths, including but not limited to piping, injectors, reservoirs, and surface equipment. Scale formation at oil-producing wells may eventually result in lower oil yields and in well failure. Scale found in oil fields may form by direct precipitation from naturally-occurring water in reservoir rocks, or as a result of produced water becoming oversaturated with scale-forming species when two incompatible waters combine. When an oil or gas well produces water, or water injection is used to enhance recovery, scale may also form. Scale is recognized as one of the top production problems in regions that are prone to scale, such as the North Sea, the US, and Canada.

Natural water in oilfields may contain dissolved substances acquired through contact with mineral phases in the natural environment. Deep subsurface water may be enriched in soluble ions through alteration and dissolution of minerals. The water in sandstone reservoirs or geological formation water that have contact with brine sources may contain abundant scale-forming ions, including but not limited to $Ca^{2+}$, $Mg^{2+}$, $Ba^{2+}$, $Sr^{2+}$, $Na^+$, $K^+$, $CO_3^{2-}$, $SO_4^{2-}$, and $Cl^-$. Sea water is also generally rich in scale-forming ions, such as ions that are by-product of marine life and water evaporation. In offshore oil production, the formation of sulfate scales may occur when sea water, which may be rich with $SO_4^{2-}$, and formation water containing high concentrations of barium and calcium are mixed.

Oilfield scale may form when the state of any natural fluid is perturbed such that the solubility limit for one or more components is exceeded. Temperature and/or pressure changes, pH shift, out-gassing, and/or the contact of incompatible water may cause the water to become oversaturated with scale-prone species and lead to the formation of scales.

Barium and strontium sulfate scales may, for example, be particularly troublesome when sulfate-rich seawater is used as an injection fluid in oil wells whose formation water is rich in barium ions. Barium and strontium sulfate generally form very hard, very insoluble scales that can be difficult to prevent by conventional chemical-based scale inhibition techniques. In some instances, this can be particularly troublesome, as barium and strontium sulfates can be co-precipitated with radium sulfate, making the scale mildly radioactive. Dissolution of sulfate scales in piping is generally difficult, possibly requiring one or more of high pH, long contact times, heat, high pressure, and high velocity circulation.

Barium sulfate, or other inorganic supersaturated salts, may precipitate onto the formation to form a scale, thereby clogging the formation and restricting the recovery of oil from the reservoir. The insoluble salts may also precipitate onto production tubing surfaces and associated extraction equipment that may, for instance, limit productivity, limit production efficiency, and compromise safety. Certain oil-containing formation waters are known to contain high barium concentrations of 400 ppm and higher. Since barium sulfate forms a particularly insoluble salt, the solubility of which declines rapidly with temperature, it may be difficult to inhibit scale formation and to prevent plugging of the oil formation and topside processes and safety equipment.

As a further example, mineral scale formation is a costly design and operating problem in seawater desalination processes. The problem is common to both reverse osmosis (RO) and multiple stage flash (MSF) evaporative processes. For technical and economic reasons, in MSF processes maximum brine temperature and reject brine concentration should generally be as high as possible; however, optimum high temperature distillation of seawater cannot generally be realized without effective control of scale formation, especially calcium scalants. The high temperature required for high efficiency in MSF evaporators may cause formation of hard tenacious scale from calcium sulfate anhydrite. Mineral scale, such as calcium carbonate, magnesium hydroxide, barium sulfate, calcium sulfate, corrosion products such as iron oxide and other deposits such as silica manganese oxide etc. are the most troublesome types of foulants. Although alkaline scale may be generally controlled by acidifying the water, increased corrosion to the system at low pH may create another problem. As for reverse osmosis processes, one of the principal causes of system shutdown and premature membrane replacement is membrane fouling, whereby scale deposits impede the flow of fluid and increase the pressure differential across a system element.

As a further example, scaling is also common problem in power plant cooling and heat transfer systems. Poor condenser performance may be one of the single largest causes of energy loss during power generation. Heat exchanger tube scaling and fouling may also cause turbine backpressure and decrease power plant efficiencies. Scaling may further reduce the performance of a heat exchanger itself, since the thermal conductivity of calcium carbonate is about 25 times lower than that of the steel from which industrial scale heat exchanger tubes are often constructed.

Scaling may also be an especially difficult problem in recirculating power plant systems, wherein high cycles of concentration can occur. For example, scaling may cause problems in cooling towers, as the film fill can be susceptible to various types of deposition. Because of evaporation (for example, 1.8% of the circulation per 10° C. of cooling) in the tower, minerals and organic substances in the recirculating water may concentrate to such a level that scaling can occur.

Cooling towers are used to remove heat from a wide range of industrial processes. Cooling towers traditionally require the use of a chemical treatment maintenance program to prevent scaling, corrosion, and biological fouling. In an exemplary traditional cooling tower set-up, re-circulating water is pumped from a basin into the heat exchange process (such as an air conditioning or refrigeration process). The effluent warm water from the heat exchange process is then pumped to the cooling tower. In the cooling tower, the water is sprayed onto wet decking (internal fill material designed to increase the surface area of the water), thus maximizing evaporation. Air is blown through the tower in a crossflow, counterflow, or parallel direction to the water flow. The water is cooled mainly through evaporative cooling as well as through some amount of sensible heat exchange (heat transfer from water to air). The cooled water is then pumped back to the basin, where the cycle continues. Make-up water is added to the basin to compensate for evaporation and water discharged as blowdown. Because of the high evaporation loss, the water recycling in a cooling tower system may be concentrated quickly, and thus perhaps more prone to scale formation. The concentrated water may be discharged as blowdown, and fresh water added to make up for the volume. Such operation generally leads to extraordinarily high volume of water usage and waste water discharge.

As a further example, scaling is also common in chemical industries, for example where the process used involves a large amount of water or involves the precipitation of solids. In particular, phosphoric acid producers generally have to contend with scale formation in all piping and equipment, which may be caused by the phosphoric acid and gypsum produced. Heat exchangers may also have scaling problems where hard water is used or where the recycling water becomes over saturated.

Scale deposition may cost billions of dollars each year. In Britain alone, the formation of scales—and the loss in efficiency and required maintenance (descaling)—in industrial process plants where water is heated or used as a coolant is estimated to cost about £1 billion per year. Such costs may be attributed to cleaning (e.g., descaling) or the poor thermal conductivity of scaled surfaces. The cost associated with scaling is generally thought to be much higher in the United States.

Scale formation can be divided into several steps. Concentrations of cationic and anionic ions, such as $Ca^{2+}$, $Mg^{2+}$, $Ba^{2+}$, $CO_3^{2-}$, $SO_4^{2-}$, $C_2O_4^{2-}$, among others, may increase to concentrations that exceed solubility limits and combine to form ion pairs or salt molecules. Those salt molecules or ion pairs may then form microaggregates, which may further grow into nucleation centers for crystallization. Microcrystals may then form from the nucleation centers to become seeds, which may grow and agglomerate, and may precipitate and adhere to surfaces to grow into large crystals. After adhering to surfaces, these crystals may continue to grow and eventually form an adherent layer of scale on a surface. The crystal scale layer may continue to grow and build up, ultimately forming a scale deposit.

Various chemical anti-scalants, such as chelants, phosphates or phosphonates (organophosphates), polycarbonates, and components of polymers, have been developed to inhibit or reduce the formation of inorganic scales. These chemical anti-scalants typically work by one of the following mechanisms: precipitation threshold inhibition, dispersion, and crystal distortion/modification.

Precipitation threshold inhibition may be achieved, for example, by combining a chelant with scale-forming cations to form a stable complex that interrupts ion-pair formation of scale molecules and inhibits the nucleation of scale crystals. Another type of precipitation threshold inhibitor are chemicals that have multiple attachment sites and can inhibit the growth of microcrystals after nucleation by occupying the active growth sites of microcrystals and blocking access to scale-forming ions. Additional examples that can be classified as precipitation threshold inhibition are ion exchange softening and acidification. Ion exchange softening involves exchanging calcium and magnesium ions with sodium, and acidification involves removing one of the reactants necessary for carbonate precipitation through acid addiction.

For dispersion, anionic chemical dispersants modify the surface charges of scaling crystals such that the crystals are dispersed in solution and do not adhere or adsorb to each other to form scales. Anionic dispersants generally modify scaling crystals by adsorbing onto the surface of growing crystals, thereby increasing the anionic charge of the growing crystals and increasing the electrostatic charge repulsion between the crystals. A high anionic surface charge may increase the activation energy barrier to crystal agglomeration, which in turn produces a more stable dispersion of the colloidal microcrystals. Therefore, chemical dispersants may effectively prevent scaling by retarding crystal agglomeration. Anionic polymers containing carboxylic acid groups may be efficient chemical dispersants.

For crystal distortion/modification, some chemicals may be used to alter the crystal forms or shapes of growing crystals such that crystal adsorption or agglomeration is retarded and the deposit of scales to surfaces is reduced. These anti-scalant chemicals may selectively adsorb onto growing crystals, altering their surface properties and disrupting the lock-and-key fit between precipitating scaling species and the growing crystals. Modifying the crystal shape and reducing the numbers of contact surfaces not only may slow the rate of crystal growth, but may make it difficult for the crystals to form hard, tenacious deposits. The modified crystals may then be swept away from surfaces by process flows. Chemical anti-scalants, which act primarily as either threshold inhibitors or dispersants, may also function as crystal modifiers since they adsorb onto the crystal surfaces.

Chemical anti-scalants based on those three mechanisms discussed above, however, are not always effective due to the complexity of scale formation. For example, precipitation threshold inhibitors that use a chelant have the disadvantage of reacting on a stoichiometric ratio (i.e., one molecule of chelant reacts with, for example, one calcium ion), which may impose very high costs if a large volume of liquid needs to be treated. In addition, chemical anti-scalants may not work due to dissociation under high process temperature or pressure, or due to interference caused by impurities from the process water. Furthermore, besides high cost and low efficiency, chemical anti-scalants generally pose safety and environmental concerns.

U.S. Pat. Nos. 6,929,749 and 7,122,148 appear to disclose methods for inhibiting silica scale formation and corrosion in aqueous systems by pre-removal of hardness ions from the source water, maintenance of electrical conductivity, and elevation of the pH level. U.S. Pat. No. 4,995,986 appears to disclose a method of removing contaminants from wastewater by the addition of aqueous solutions of magnesium chloride and sodium silicate; however, it appears to focus on the in situ precipitation of an amorphous magnesium silicate by a controlled process of addition of magnesium salts and silicate salts—which could increase the amount of scale—and the subsequent removal of pollutants from the liquid media, which is not expected to give significant improvement in the removal of scalants. U.S. Pat. No. 4,713,177 may disclose a process for reducing calcium, magnesium, and aluminum salt scale build-up by adding a precipitating reagent to preferentially precipitate calcium, magnesium, and aluminum ions. PCT International Publication No. WO 84/02126 appears to disclose a method for preventing formation of calcium and magnesium scales by adding low or negligibly water soluble alkali metal silicates or silicic acid. However, those references do not appear to disclose preventing or reducing scale formation or corrosion by adsorbing to scale crystals a non-aqueous, particulate scale-adsorbent agent, such as calcium silicate.

SUMMARY OF THE INVENTION

The present inventors have surprisingly found that the addition of non-aqueous, particulate anti-scale materials, such as calcium silicate, to at least one scale-forming fluid may cause the reduction or prevention of scale formation. The scale adsorbent and the antiscalant technologies described herein may be able to overcome many of the shortfalls of the technologies currently employed for controlling scale/deposit in aqueous processing systems. Disclosed herein are methods of preventing or reducing scale formation or corrosion comprising combining a scale-forming fluid with at least one anti-scale material chosen from at least one scale-adsorbent agent. Also disclosed herein are methods of preventing or reducing scale formation or corrosion by which at least one scale-adsorbent agent adsorbs scale crystals present in at least one scale-forming fluid, thus preventing scale crystals from depositing and propagating on system surfaces. Further disclosed herein are methods to prevent or reducing scale formation or corrosion, which can also be used to achieve zero liquid discharge (ZLD).

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 17 (b) is a scanning electron micrograph at 2000× magnification showing the scale formed on a cover glass in the particulate anti-scale containing sample of Example 6.

DETAILED DESCRIPTION OF THE INVENTION

Figure 1A:
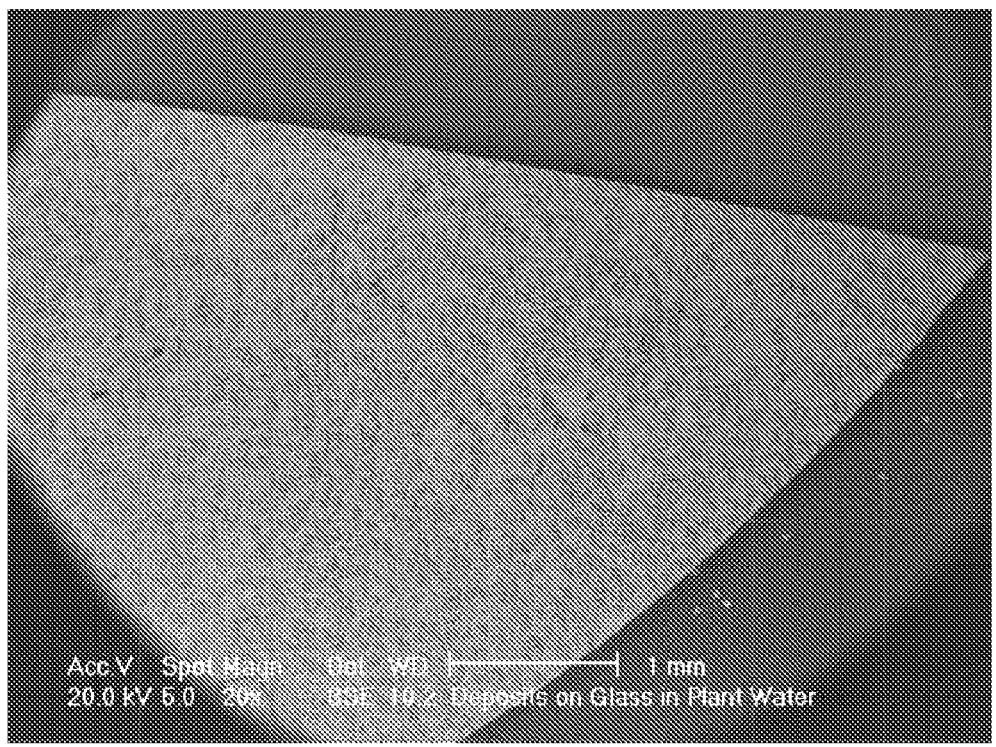
FIG. 1a is a scanning electron micrograph at 20× magnification of calcium carbonate scales covering the surface of a cover glass after natural hard water is boiled.

The descaling and anti-corrosion methods described herein generally involve dispersion by adsorption. In one embodiment, and without wishing to be bound by theory, natural or synthetic particulate materials may adsorb the nucleation centers or microcrystal seeds of scale molecules, dispersing the growing scale crystals onto the materials, which provide a high surface area. The materials may remain suspended in the at least one scale-forming fluid, so that scale deposit on the equipment surfaces can be prevented or minimized. Unlike the dispersion function of the specialty anti-scalant chemicals, which modify the surface charges of scaling microcrystals, the adsorption mechanisms described herein generally use at least one adsorbent agent to carry away and disperse the nucleation centers or microcrystals of at least one scaling compound, so that scale deposits onto equipment surfaces can be avoided.

In one embodiment, a particulate natural adsorbent, such as diatomaceous earth, or powdered synthetic silicates, such as calcium silicates, are used as microcrystal adsorbents or carriers. According to another embodiment, a powdered material, such as hydrated lime, upon mixing with the scaling prone water can promote the co-precipitation of precipitates such as calcium silicates, and these in situ formed silicates can act as adsorbents or carriers.

Scale-Forming Fluid

The at least one scale-forming fluid may be any fluid (e.g., a liquid or a gas) that may lead to the formation of scale during the administration of a given process. The at least one scale-forming fluid comprises at least one scaling compound. Scale may form from a one scale-forming fluid, or scale may form from the interaction of scaling compounds present in more than one scale-forming fluid. In one embodiment, the at least one scale-forming fluid is water. The water may be chosen from, for example, tap water, purified water, recycled process water, reservoir water, geological subsurface water, seawater, brine, and hard water. In another embodiment, the at least one scale-forming fluid is oil. In a further embodiment, the at least one scale-forming fluid is a solution. In yet another embodiment, the at least one scale-forming fluid is a bleaching solution for paper pulp. In yet another embodiment, the at least one scale-forming fluid is a liquor subjected to distillation.

The at least one scale-forming fluid is contained in at least one fluid handling system. Exemplary fluid handling systems include, but are not limited to, a boiler, an evaporator, a reactor, a cooling water system, a heat exchanger, a pipe, a filter, a membrane surface, a hollow fiber, an oil well, or a secondary oil recovery unit. The fluid handling system may be constructed of various materials, including but not limited to plastic, glass, metal, and stainless steel.

The at least one scaling compound is any substance present in at least one scale-forming fluid that may participate in or cause the formation of scale during the administration of a given process. In one embodiment, the at least one scaling compound is an inorganic salt. Exemplary inorganic salts include, but are not limited to, calcium carbonate, calcium sulfate, calcium oxalate, magnesium carbonate, and barium sulfate. In another embodiment, the at least one scaling compound is at least one scale-forming ion. Exemplary scale-forming ions include, but are not limited to, $Ca^{2+}$, $Mg^{2+}$, $Ba^{2+}$, $Sr^{2+}$, $Na^+$, $K^+$, $OH^-$, $NO_3^-$, $CO_3^{2-}$, $SO_4^{2-}$, $PO_4^{3-}$, $HPO_4^{2-}$, $H_2PO_4^-$, $C_2O_4^{2-}$, $SiO_3^{2-}$, $F^-$, and $Cl^-$. In a further embodiment, the at least one scaling compound is silica. In yet another embodiment, the at least one scaling compound is a salt comprising at least two scale-forming ions. In yet a further embodiment, the at least one scaling compound is a salt comprising at least one scale-forming cation and at least one scale-forming anion. In still another embodiment, the at least one scaling compound is a salt silicate comprising at least one scale-forming ion. In still a further embodiment, the at least one scaling compound is a salt comprising at least one scale-forming ion.

Anti-Scale Material

The methods disclosed herein involve contacting at least one scale-forming fluid with at least one anti-scale material. The anti-scale material may be introduced to the at least one scale-forming fluid in a substantially dry form, including but not limited to granules, pellets, flakes, particles, and powder, or may be introduced as a slurry. In one embodiment, the at least one anti-scale material is only partially soluble in the at least one scale-forming fluid. In another embodiment, the at least one anti-scale material is not soluble in the at least one scale-forming fluid. The low to minimal solubility of the at least one anti-scale material may provide safety or environmental benefits, in that the at least one anti-scale material that has interacted with the at least one scale-forming material can be directly discharged into the environment without further processing. In yet another embodiment, the at least one anti-scale material is inorganic. In yet a further embodiment, the at least one anti-scale material is stable (e.g., does not dissolve) under the conditions (e.g., pressure, temperature, flow rate, turbulence) present in the at least one fluid handling system. In another embodiment, the at least one anti-scale material has an affinity for at least one scale-forming compound, for example due to electrical charge and/or chemical reactivity. In a further embodiment, the at least one anti-scale material does not corrode or otherwise negatively impact the surface and/or structural integrity of the at least one fluid handling system. In yet another embodiment, the at least one anti-scale material forms a suspension when added to the at least one scale-forming fluid.

In one embodiment, the at least one anti-scale material is at least one scale-adsorbent agent. Scale-adsorbent agents may adsorb one or more scale-forming compounds present in the at least one scale-forming fluid, thus reducing or preventing the formation of scale on a surface of the at least one fluid handling system. In one embodiment, the at least one scale-adsorbent agent is a silicate material. Exemplary silicate materials include, but are not limited to, natural silicates (such as, for example, calcium silicate (e.g., wollastonite)) and synthetic silicate (such as, for example, silica gel). In another embodiment, the at least one scale-adsorbent agent is calcium silicate. Exemplary calcium silicates include, but are not limited to, amorphous calcium silicates, tobermorite, xonotlite, foshagite, riversideite, pseudowollastonite, and gyrolite. In a further embodiment, the at least one scale-adsorbent agent is a mineral material. Exemplary mineral materials include, but are not limited to, diatomaceous earth (also called "DE" or "diatomite") and kaolin (and other) clay. The DE may be from one or more sources, including fresh water and salt water sources. In yet another embodiment, the at least one scale-adsorbent agent is a cellulose powder. In yet a further embodiment, the at least one scale-adsorbent agent is vermiculite. In still another embodiment, the at least one scale-adsorbent agent is powdered calcium silicate, derived from diatomaceous earth. In yet a further embodiment, the at least one scale-adsorbent agent is powdered magnesium silicate, derived from diatomaceous earth. In another embodiment, the at least one scale-adsorbent agent is a glass, such as for example a soda lime glass, a calcium aluminosilicate glass, e-glass, or cullet. In a further embodiment, the at least one scale-adsorbent agent is a zeolite, including a salt of a zeolite. In yet another embodiment, the at least one scale-adsorbent agent is an insoluble or low-solubility silicates or aluminosilicates, such as for example halloysite. In yet a further embodiment, the at least one particulate scale-adsorbent agent is smectite. In still another embodiment, the at least one particulate scale-adsorbent agent is chosen from the group consisting of diatomaceous earth, silica gel, cellulose powder, vermiculite, wollastonite, zeolite, halloysite, smectite, and kaolin and other clays.

In one embodiment, the at least one anti-scale material comprises composite particles. In one embodiment, at least one scale-adsorbent agent is provided as a coating on at least one particulate substrate. For example, a scale adsorbent agent may be precipitated onto at least one low density substrate, such as expanded perlite or polymer, which may reduce the density of the anti-scale material and enhance the suspension in liquid. As another example, at least one scale-adsorbent agent may be precipitated onto at least one hollow substrate, such as a polymeric, glass, or ceramic microsphere. In one such embodiment, use of at least one hollow substrate may control the buoyancy of the at least one anti-scale material, perhaps even matching the buoyancy of the at least one anti-scale material to that of the scale-forming fluid.

In one embodiment, the at least one anti-scale material has a BET specific surface area ranging from about 1 $m^2/g$ to about 500 $m^2/g$. In another embodiment, the BET surface area ranges from about 50 $m^2/g$ to about 200 $m^2/g$. In a further embodiment, the BET surface area ranges from about 100 $m^2/g$ to about 200 $m^2/g$. One of ordinary skill in the art will readily understand appropriate methods and devices capable of measuring the BET surface area of an at least one anti-scale material. BET surface area of a powdered material may be measured, for example, by a Gemini III 2375 Surface Area Analyzer, which uses pure nitrogen as the sorbent gas, available from Micromeritics Corporation.

In one embodiment, the at least one anti-scale material has a median particle size ranging from 0.1 microns to about 100 microns, or more (as measured by Microtrac). In another embodiment, the at least one anti-scale material has a median particle size ranging from about 1 micron to about 50 microns. In a further embodiment, the median particle size ranges from about 5 microns to about 30 microns In yet another embodiment, the median particle size is about 20 microns. One of ordinary skill in the art will readily understand that the particle size distribution may be quantified by determining the difference in particle size distribution between components of the at least one anti-scale material. One method employs a laser diffraction instrument, for example, a Leeds & Northrup Microtrac Model X-100. That instrument is fully automated, and the results are obtained using a volume distribution formatted in geometric progression of 100 channels, running for 30 seconds with the filter on. The distribution is characterized using an algorithm to interpret data characterized by a diameter, d. The $d_{50}$ value of the sample may be identified by the instrument.

The at least one anti-scale material may, in some embodiments, adsorb one or more species or particles of the at least one scale-forming compound, such that the interaction is greater than stoichiometric. In one embodiment, the at least one anti-scale material may adsorb crystals or other nucleated structures of scale formed by an at least one scaling compound. In still another embodiment, the at least one anti-scale material shows affinity toward at least one scale-forming compound.

The at least one anti-scale material may be provided to the at least one scale-forming fluid in different ways. In one embodiment, the at least one anti-scale material is added as a particulate material to the at least one scale-forming fluid. In another embodiment, at least one anti-scale precursor compound is added to the at least one scale forming fluid, and the at least one anti-scale precursor compound and at least one scale-forming compound interact to form an at least one particulate anti-scale material, for example by precipitation. The at least one anti-scale precursor compound may be provided as a solution, slurry, granules, pellets, flakes, particles, and powder and may be any compound known to those of skill in the art to interact with at least one scale forming compound to form an at least one anti-scale material. The at least one anti-scale adsorbent may be incorporated into filter pads, honeycomb grids, or other forms of media and used in at least one scale-forming liquid. In one embodiment, the precursor-formed at least one anti-scale material reduces and/or prevents scale not only by having co-precipitated at least one first scaling compound but also by then adsorbing at least one second scaling compound present in the at least one scale-forming fluid. In another embodiment, the at least one anti-scale precursor compound is chosen from the group consisting of hydrated lime, sodium phosphate, and sodium silicate. In another embodiment, the at least one second scaling compound is of the same kind as the at least one first scaling compound. In a further embodiment, the at least one second scaling compound is of a different kind than the at least one first scaling compound.

The at least one anti-scale material may be introduced to the at least one scale-forming fluid in any amount to effect the required or desired level or scale reduction or prevention. In one embodiment, the added amount of at least one anti-scale material is about 0.01 g/L to about 20 g/L. In another embodiment, the added amount of at least one anti-scale material is about 0.01 g/L to about 10 g/L. In a further embodiment, the added amount of at least one anti-scale material is about 0.01 g/L to about 5 g/L. In yet another embodiment, the added amount of at least one anti-scale material is about 0.01 g/L to about 2 g/L. In yet a further embodiment, the added amount is about 0.05 g/L to about 0.5 g/L. In still another embodiment, the added amount is greater than or equal to about 0.01 g/L. In still a further embodiment, the added amount is about 0.05 g/L. In another embodiment, the added amount is about 0.1 g/L. In a further embodiment, the added amount is about 0.25 g/L. In yet another embodiment, the added amount is about 0.5 g/L.

An at least one scale-adsorbent agent may exhibit one or more conventional anti-scaling effects in addition to adsorption. In one embodiment, the at least one anti-scale material is also a precipitation threshold inhibitor. In another embodiment, the at least one anti-scale material is also a dispersant. In a further embodiment, the at least one anti-scale material is also a crystal distortion/modification chemical.

In addition to preventing scale, an at least one anti-scale material may also be useful to moderate one or more chemical characteristics of a liquid. In one embodiment, an at least one anti-scale material is used to moderate the hardness of a liquid. In another embodiment, an at least one anti-scale material us used to moderate the total dissolved solids of a liquid. In a further embodiment, an at least one anti-scale material is to moderate the alkalinity of a liquid.

In one embodiment, an at least one anti-scale material is used to reduce or control scale in a liquid having a hardness ranging from about 50 ppm to about 10,000 ppm or higher. In another embodiment, an at least one anti-scale material is used to reduce or controls scale in a liquid having hardness ranging from about 50 ppm to saturation. In a further embodiment, an at least one anti-scale material is used to reduce or control scale in a liquid having a total dissolved solids content ranging from about 100 ppm to about 15,000 ppm or higher. In yet another embodiment, an at least one anti-scale material is used to reduce or controls scale in a liquid having hardness ranging from about 100 ppm to saturation. In yet a further embodiment, an at least one anti-scale material is used to reduce or control scale in a liquid having alkalinity (as $CaCO_3$) ranging from about 50 ppm to about 8,000 ppm or higher.

After the interaction of the at least one anti-scale material with the at least one scale-forming fluid comprising at least one scaling compound, the adsorbed scale material may remain suspended with the at least one anti-scale material or otherwise present in the at least one scale-forming fluid but dispersed with the at least one anti-scale material. In one embodiment, a portion of the at least one anti-scale material and the adsorbed scale material can be separated from the at least one scale-forming fluid. For example, the adsorbed or dispersed scale can be filtered along with the anti-scale particulates from the at least one scale-forming fluid, or allowed to settle out of the at least one scale-forming fluid, or otherwise separated from the scale-forming fluid by conventional fluid/particle separation methods. In another embodiment, all or substantially all of the at least one anti-scale material and the adsorbed scale material can be separated from the at least one scale-forming fluid. Separation and recovery can be particularly advantageous in embodiments where the scale material is toxic, radioactive, or otherwise hazardous, or is subject to environmental discharge regulations.

Use of the at least one scale adsorbent in a recycling water system, such as a cooling tower, may, in some embodiments, also provide additional low water usage and zero liquid discharge (ZLD) benefits. This may occur because the at least one scale adsorbent may act as a buffer to adsorb scales and to moderate hardness and alkalinity of the water, thus controlling the total hardness and alkalinity at relatively low equilibrium levels without scale formation on the protected equipment. This may allow the recycled water to be used at much higher concentration rate, advantageously reducing water use and reducing waste water discharge.

Use of at least one scale-adsorbent agent in a fluid system may also, in some embodiments, provide beneficial biocidal effects. This may occur because systems using at least one scale-adsorbent agent for scale control may be operated at a higher alkalinity and/or hardness than comparable systems relying on chemical inhibition-based methods for scale control. These higher alkalinity and hardness conditions may inhibit growth of bacteria, algae, and other microorganisms. In one embodiment, at least one fungicide is incorporated into the at least one anti-scale adsorbent to enhance the biocide effects.

In a further embodiment, the adsorbed scale material is discharged to the environment along with the at least one scale-forming fluid, after the at least one scale-forming fluid has been used in the at least one fluid handling system.

In still a further embodiment, adsorbed or attached scale material on a filter pad, sieve screen, honeycomb filter, or other frame of grid media made of at least one anti-scale adsorbent can be detached and the media can be reused in a scale-forming liquid.

In one embodiment, the at least one scale-adsorbent agent may also be used for a secondary purpose, such as use as a filler for a paper. In such a case, the at least one scale adsorbent agent may be added to the circulating water system of a papermaking machine and may be at least partially incorporated into the paper sheet as a filler. In some such embodiments, the at least one scale-adsorbent agent may have properties suitable for use as a bulking paper filler.

Other than in the examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations and, unless otherwise indicated, the numerical values set forth in the specific examples are reported as precisely as possible. Any numerical value, however, inherently contains certain errors necessarily resulting from the standard deviation found in their respective testing measurements.

By way of non-limiting illustration, examples of certain embodiments of the present disclosure are given below.

EXAMPLES

Example 1

Carbonate and sulfate scales were identified and collected in the heat exchangers of a silicate plant involved in the production of synthetic silicates, in which a conventional organo-phosphate anti-scalant had been added to hard water in an effort to reduce scale formation. The scales were of mixed crystal types and displayed intergrowth scale phases, as found in the internal slurry flow pipes of the exchangers. Sulfate scales were more prevalent toward the hot end of the exchangers, while carbonate scales were more prevalent toward the cool ends. Scale samples were analyzed by X-ray fluorescence (XRF) to determine their composition, and the scale phase was determined by X-ray diffraction (XRD)

analysis. The compositions and phase of carbonate and sulfate scale samples from the silicate plant heat exchangers are listed in Table 1.

TABLE 1

| Compound % | Carbonate Scale | Sulfate Scale |
|---|---|---|
| CaO | 66.4 | 28.81 |
| $SO_3$ | 10.01 | 51.10 |
| $SiO_2$ | 10.23 | 10.01 |
| MgO | 10.91 | 7.32 |
| $Al_2O_3$ | 0.47 | 1.28 |
| $Fe_2O_3$ | 0.32 | 0.37 |
| $P_2O_5$ | 1.54 | 1.04 |
| $Na_2O$ | 0.05 | 0.02 |
| Total | 99.93 | 99.95 |
| $SO_3$/CaO | 0.15 | 1.77 |
| Scale phase | kutnohorite | anhidrite |

The carbonate scales were predominantly kutnohorite, while the sulfate scales were mainly anhydrite. Both scale types contained a significant amount of magnesium and about 10% $SiO_2$. The source of the $SiO_2$ is thought to mainly be the presence of silicate scales, but it is possible that the diatomaceous earth (DE) slurry lines may have also trapped some DE particles. Both types of scales had greater than 1% $P_2O_5$ content, which was attributable to the use of the organophosphate anti-scalant. The conventional anti-scalant failed to inhibit scale formation, and may also have caused corrosion of the heat exchanging equipment.

The plant water and certain slurries were also analyzed for various properties, including the major cationic and anionic species present. The results are reported in Table 2.

TABLE 2

| Sample | Solids (%) | pH | Conductivity (µS/cm) | $Ca^{2+}+Mg^{2+}$ (ppm) | $SO_4^{2-}$ (ppm) |
|---|---|---|---|---|---|
| Plant Water | NA | 6.4 | 1490 | 220 | 297 |
| DE Slurry Filtrate | 15 | 7.2 | 1470 | 147 | 293 |
| Product (synthetic silicate) Slurry Filtrate | 8.1 | 8.9 | 923 | 76 | 234 |
| pH-Adjusted DE Slurry Filtrate | 13.3 | 8.0 | 1280 | 114 | 268 |
| Deionized Water DE Slurry Filtrate | 10 | 5.8 | 288 | 10 | 66 |

As shown in Table 2, the plant water has a conductivity of 1490 µS/cm, which is equivalent to about 750 ppm of dissolved solids. The DE slurry made from the plant water had about the same hardness. The plant water also contained a high level of scale-forming species, including $Ca^{2+}$, $Mg^{2+}$, and $SO_4^{2-}$. The DE feed of the silicate plant did not contribute significant scale-forming species to the slurry water, as shown by the deionized water DE slurry filtrate of similar solid loading that revealed only small amounts of scale-forming species dissolved from the DE ores.

The pH-adjusted DE slurry filtrate was made from the plant water, but the pH was adjusted to slightly alkaline by adding a small amount of lime, from about 0.1 to 0.5 g/l. This slurry contained a similar amount of sulfate as the plant water, but the hardness was reduced due to the increase in pH. The addition of lime may have had some scale prevention effect on the DE slurry by reducing the $Ca^{2+}Mg^{2+}$ concentration. The hardness of the water was also reduced (as shown by the conductivity measurement). The lime was also thought to have co-precipitated calcium silicate.

The sulfate content of the filtrate from the product slurry remained roughly the same as the plant water, while the alkaline earth content ($Ca^{2+}+Mg^{2+}$) was significantly reduced from 220 ppm to 74 ppm. This reduction in alkaline earth content was due to the new dissolution equilibrium established between the synthetic silicate phases and the processing water.

In all, scale formation in the heat exchanging system was thought to be caused by the use of hard plant water, and was less likely attributable to the DE feed, which contributed very low amounts of scale-forming species. Water softening through pH-adjustment by the addition of a small amount of lime displayed some scale control (i.e., reduction) in the system.

Example 2

When naturally hard plant water is heated and vaporized, it becomes oversaturated with the salts it contains, usually calcium and magnesium salts, such as $CaCO_3$ and $MgCO_3$. Scale crystals can grow on the inside walls of the container used to boil the water. Natural hard water having a pH of 6.9 and conductivity of 1.20 mS/cm (equivalent to about 600 ppm dissolved solids) was used to study the anti-scaling properties of various powdered materials. The materials tested included those shown in Table 3.

TABLE 3

| Sample | Composition |
|---|---|
| 1 | DE-derived synthetic calcium silicate ($CaO/SiO_2$ molar ratio ≈1.50) BET Surface Area = 105 $m^2/g$ |
| 2 | DE-derived synthetic calcium silicate ($CaO/SiO_2$ molar ratio ≈0.42) Median ($d_{50}$) Particle Size = 18.0 µm (CILAS granulometer) BET Surface Area = 120 $m^2/g$ |
| 3 | DE-derived synthetic calcium silicate ($CaO/SiO_2$ molar ratio ≈0.58) Median ($d_{50}$) Particle Size = 18.0 µm (CILAS granulometer) BET Surface Area = 165 $m^2/g$ |
| 4 | Precipitated silica-derived synthetic calcium silicate ($CaO/SiO_2$ molar ratio ≈0.42) Median ($d_{50}$) Particle Size = 18.0 µm (CILAS granulometer) BET Surface Area = 120 $m^2/g$ |
| 5 | DE-derived synthetic magnesium silicate ($MgO/SiO_2$ molar ratio ≈0.48) BET Surface Area = 180 $m^2/g$ |
| 6 | Calcined Marine Diatomite Median ($d_{50}$) Particle Size = 14.0 µm (Laser Sizer granulometer) |
| 7 | 20 µm Cellulose Powder from Aldrich |
| 8 | Britesorb ® Silica Gel from PQ Corporation |
| 9 | Hydrated Lime |
| 10 | Kaolinite |
| 11 | Sodium Silicate |

The samples were added in the amount shown in Table 4 to separate glass beakers containing natural hard water at a concentration of 0.5 g/L, with the exception of hydrated lime and sodium silicate, which were added at a concentration of 0.5 g/550 ml of natural hard water. Each mixture was subjected to evaporation over a hotplate, resulting in the evaporation of the listed amount of water. Natural hard water without any material added was used as a control. A piece of cover glass was placed in each beaker so any scale that developed on the glass could be examined under a scanning electron microscope.

Figure 1B:
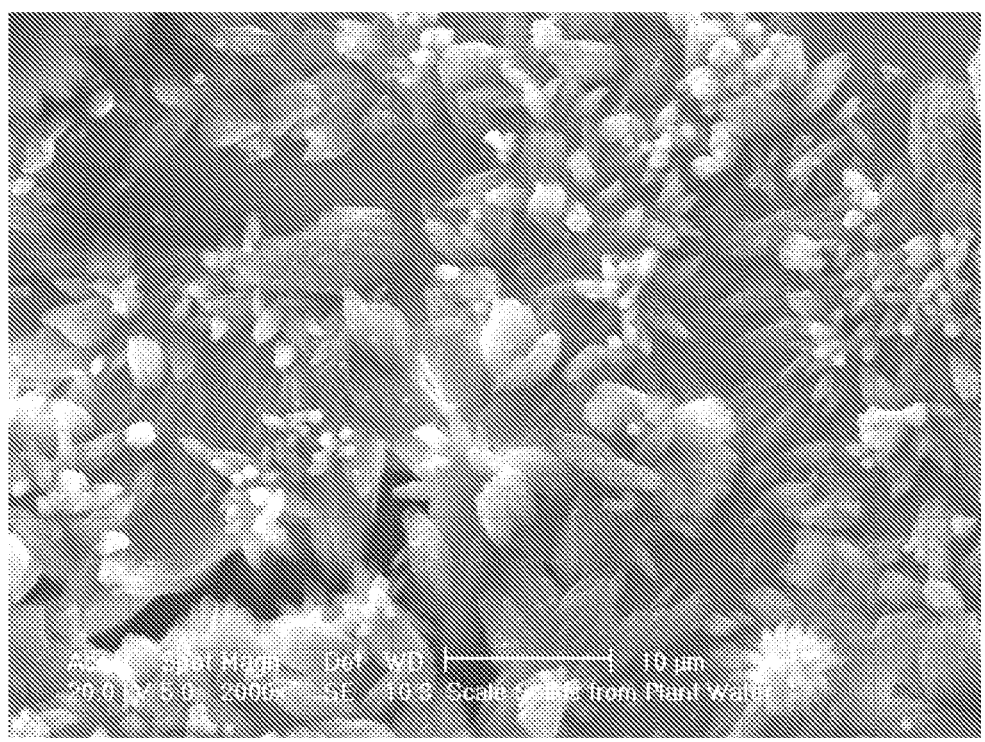
FIG. 1b is a scanning electron micrograph at 2000× magnification of calcium carbonate scales formed on the surface of a cover glass after natural hard water is boiled.
Figure 2:
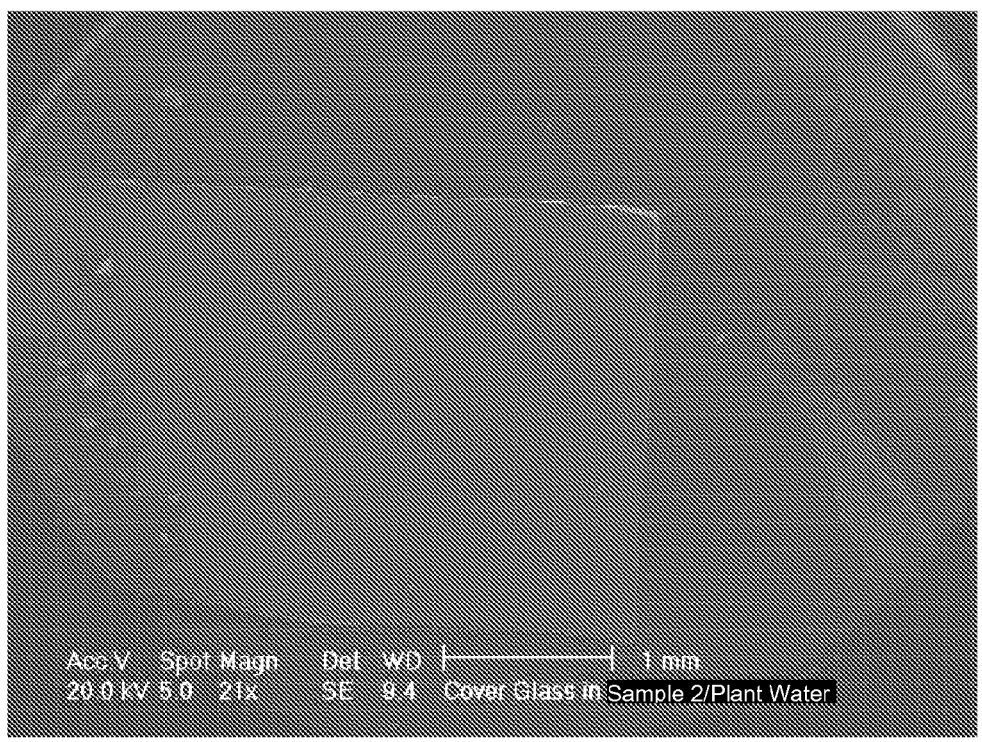
FIG. 2 is a scanning electron micrograph at 21× magnification showing that no scales formed on glass when 0.5 g/L of Sample 2 is added to natural hard water and boiled.
Figure 3:
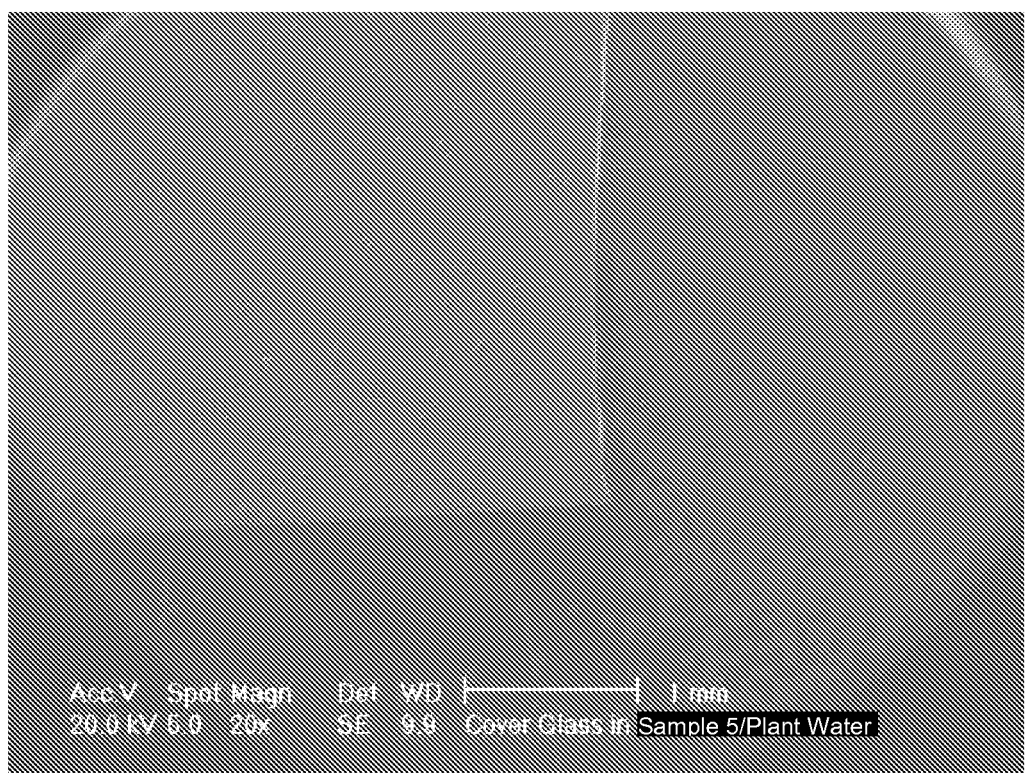
FIG. 3 is a scanning electron micrograph at 20× magnification showing relatively few scale calcium carbonate particles formed on glass when 0.5 g/L of Sample 5 is added to natural hard water and boiled.

Table 4 shows the relative effectiveness of various materials at preventing or reducing scale formation. The amount of scaling in each beaker was determined using a subjective scale of 100% scale formation (control beaker; FIGS. 1a and 1b) to 0% scale formation (no scales could be isolated from the beaker). Scanning electron microscopy (SEM) analysis showed that 0.5 g/L of Sample 2 (FIG. 2), Sample 4, and Sample 9 resulted in no scale formation on the cover glass and that only a small amount of scale formation was observed with 0.5 g/L of Sample 1, Sample 3, Sample 5 (FIG. 3), and Sample 6. Sample 7, Sample 8, and Sample 10 showed some but not a significant improvement in scale formation, while Sample 11 showed an improvement in scale formation by about half.

TABLE 4

| Sample | Water Volume (ml) | Loading (g) | pH | Evaporated water (ml) | Scaling (%) |
|---|---|---|---|---|---|
| Hard Water (from Example 1) | 1000 | NA | 6.50 | 900 | 100 |
| 1 | 1000 | 0.5 | 7.42 | 900 | 20 |
| 2 | 1000 | 0.5 | 6.90 | 900 | 0 |
| 3 | 1000 | 0.5 | 6.81 | 900 | 20 |
| 4 | 1000 | 0.5 | 6.82 | 900 | 0 |
| 5 | 1000 | 0.5 | 6.80 | 900 | 20 |
| 6 | 1000 | 0.5 | 6.63 | 900 | 20 |
| 7 | 1000 | 0.5 | 6.65 | 900 | 80 |
| 8 | 1000 | 0.5 | 6.63 | 900 | 80 |
| 9 | 550 | 0.5 | 9.73 | 450 | 0 |
| 10 | 1000 | 0.5 | 6.64 | 900 | 80 |
| 11 | 550 | 0.5 | 9.70 | 450 | 50 |

Figure 4:
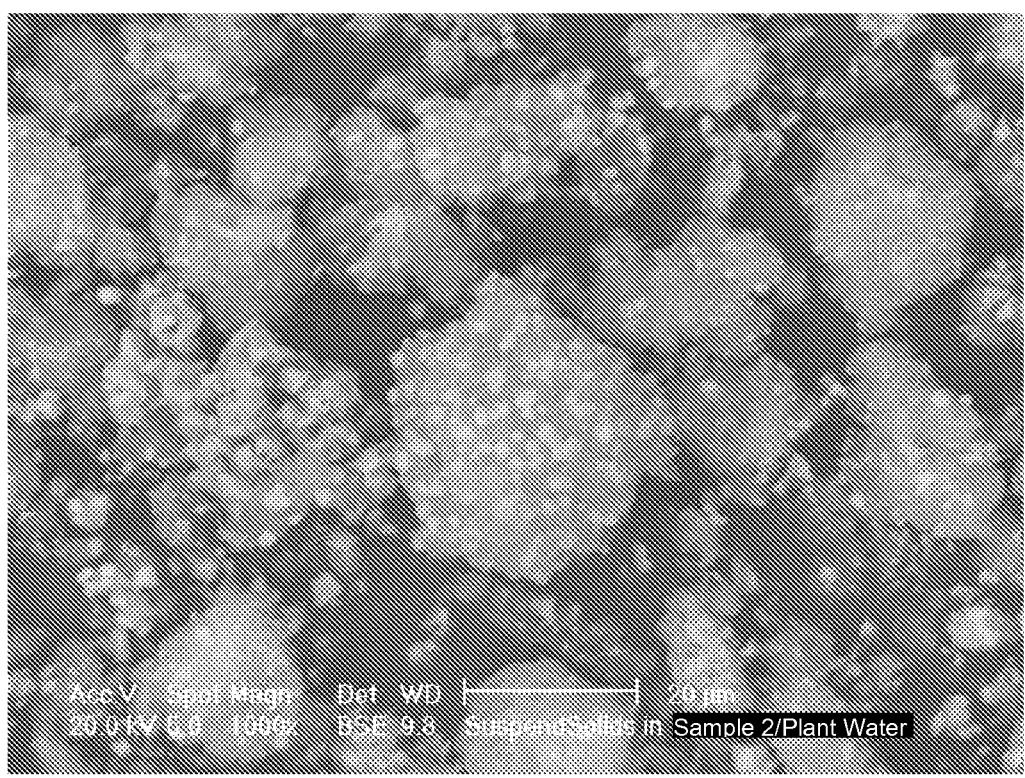
FIG. 4 is a scanning electron micrograph at 1000× magnification showing microcrystals of scale calcium carbonate evenly adsorbed or attached onto the surfaces of Sample 2.
Figure 5:
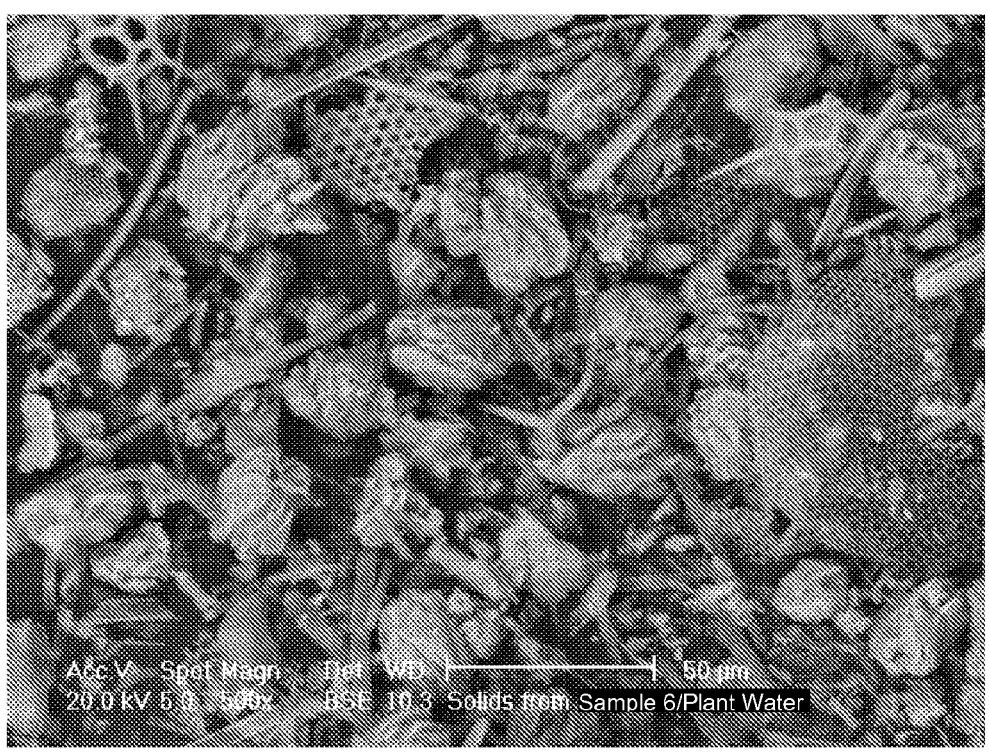
FIG. 5 is a scanning electron micrograph at 500× magnification of scale calcium carbonate microcrystals distorted and dispersed among Sample 6.
Figure 6:
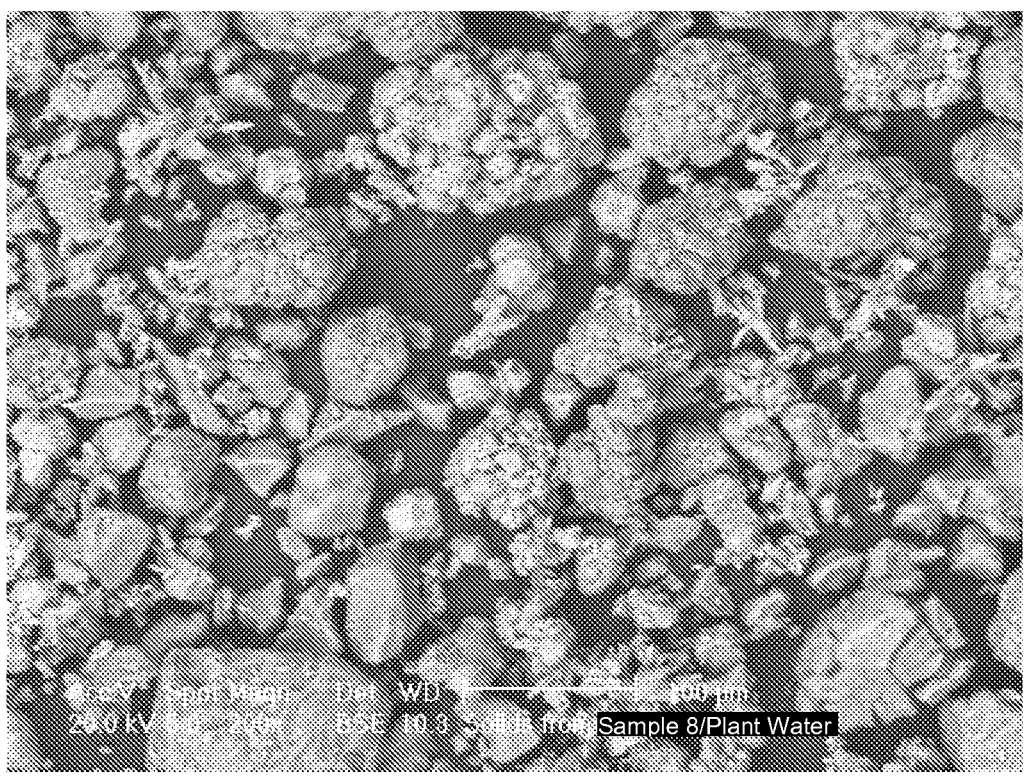
FIG. 6 is a scanning electron micrograph at 200× magnification of scale microcrystals distorted and dispersed among Sample 8.
Figure 7:
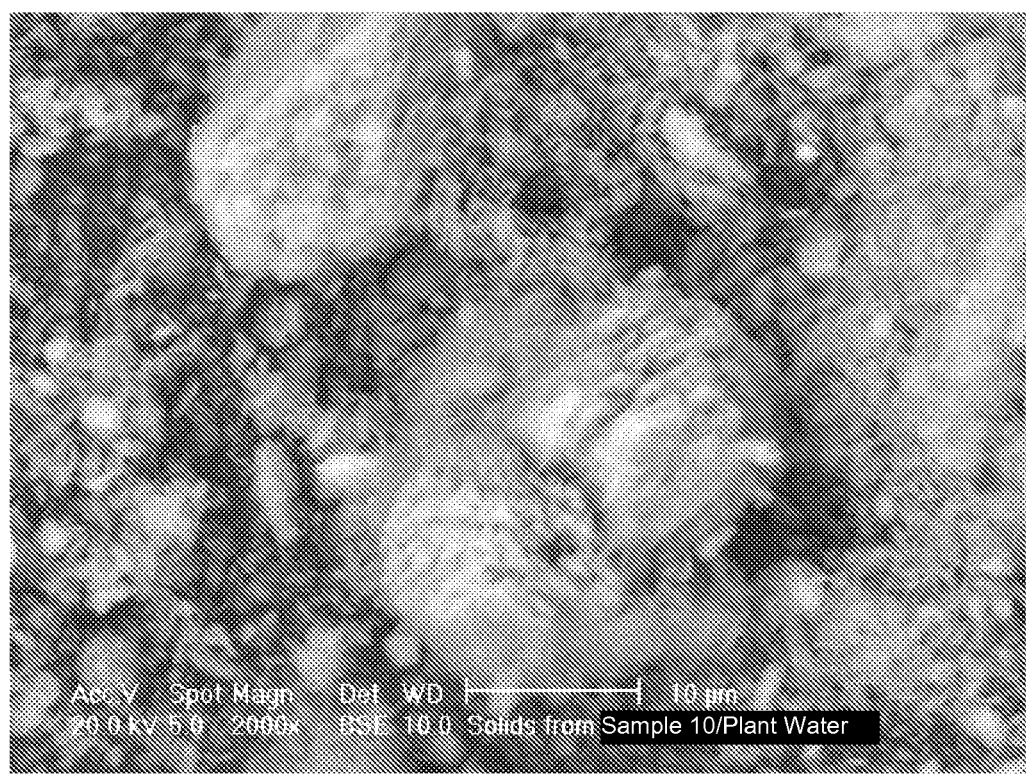
FIG. 7 is a scanning electron micrograph at 2000× magnification of scale microcrystals distorted by Sample 10.
Figure 8:
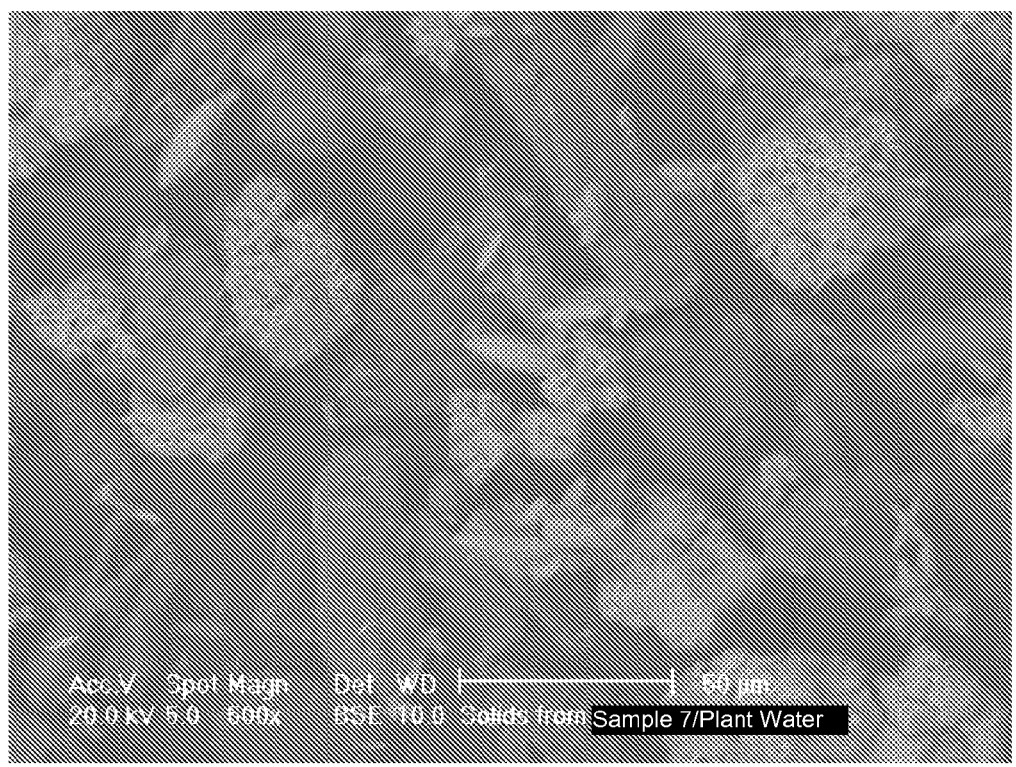
FIG. 8 is a scanning electron micrograph at 500× magnification of scale microcrystals modified by Sample 7.
Figure 9:
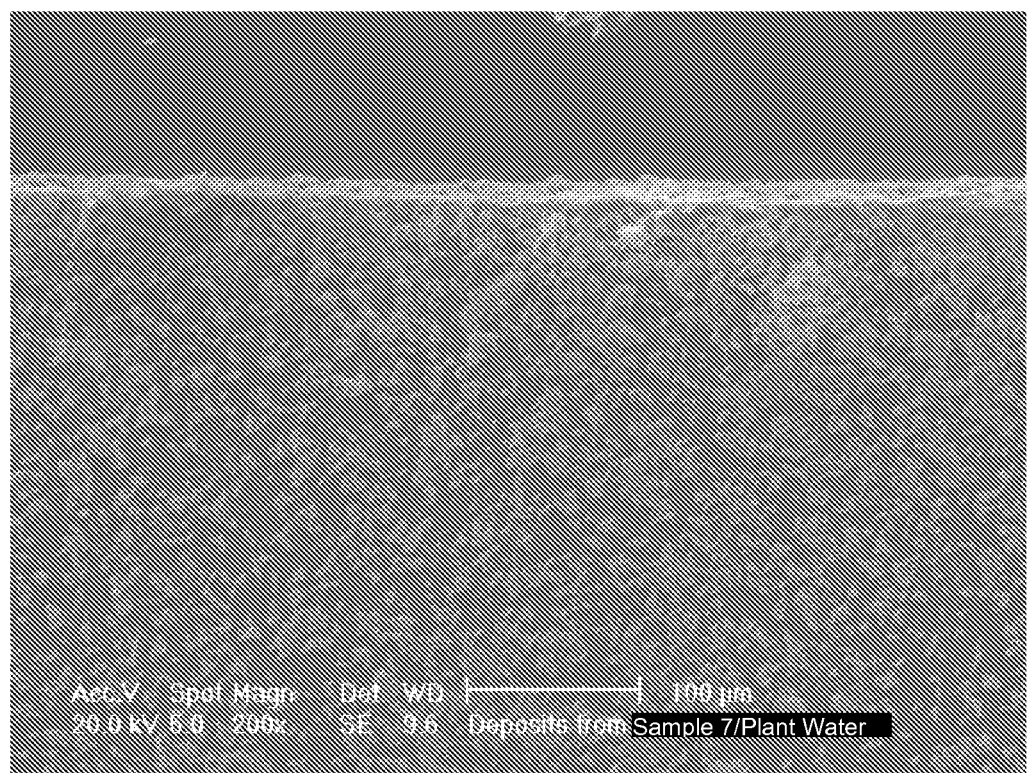
FIG. 9 is a scanning electron micrograph at 200× magnification of scale formation on glass when 0.5 g/L of Sample 7 is added to natural hard water and boiled.
Figure 10:
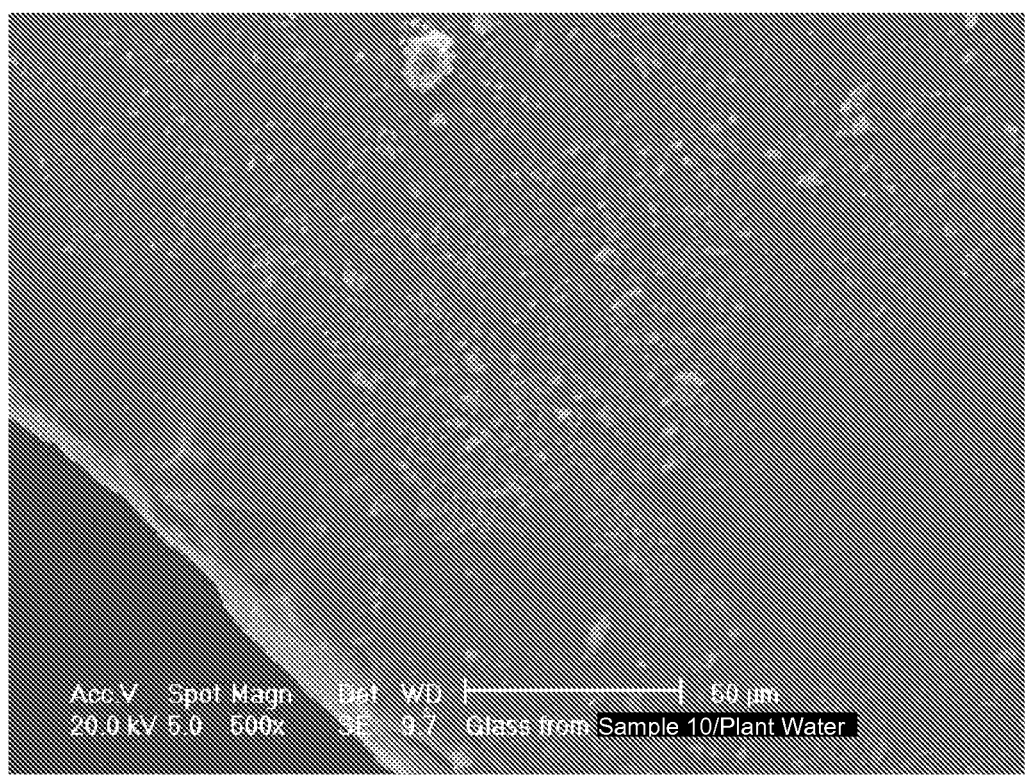
FIG. 10 is a scanning electron micrograph at 500× magnification of scale formation on glass when 0.5 g/L of Sample 10 is added to natural hard water and boiled.
Figure 11:
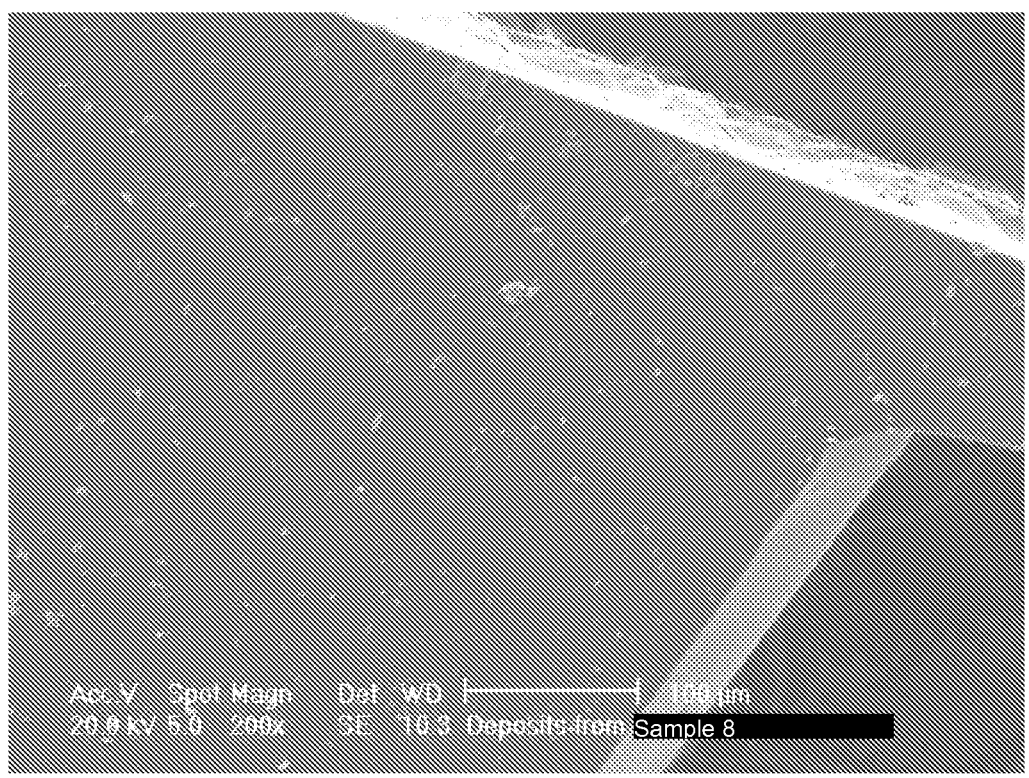
FIG. 11 is a scanning electron micrograph at 200× magnification of scale formation on glass when 0.5 g/L of Sample 8 silica gel powder is added to natural hard water and boiled.

Scanning electron microscopy revealed that calcium silicate materials, such as Sample 1, Sample 2 (FIG. 4), Sample 3, and Sample 4, adsorb scaling crystals. Materials such as diatomaceous earth (Sample 6), silica gel (Sample 8), kaolin clay (Sample 10), and cellulose powder (Sample 7) did not show significant adsorption of scale crystals, but may have reduced scale formation through other mechanisms, such as distortion of the scaling crystals and dispersion (FIGS. 5-8, respectively). FIGS. 9-11 show that scale formation was reduced after adding cellulose powder (Sample 7), kaolinite powder (Sample 10), and silica gel (Sample 8), respectively, to natural hard water. Unlike calcium silicates, those powdered materials—as well as diatomaceous earth (Sample 6)—reduced scaling by crystal distortion/modification and dispersion mechanisms. As revealed under SEM, those powdered materials did not appear to show adsorption of the scale crystals, but they did apparently affect the scale crystal morphology as well as helped to disperse the scale crystals, thus reducing the attachment of scale crystals in the system surfaces.

Figure 12:
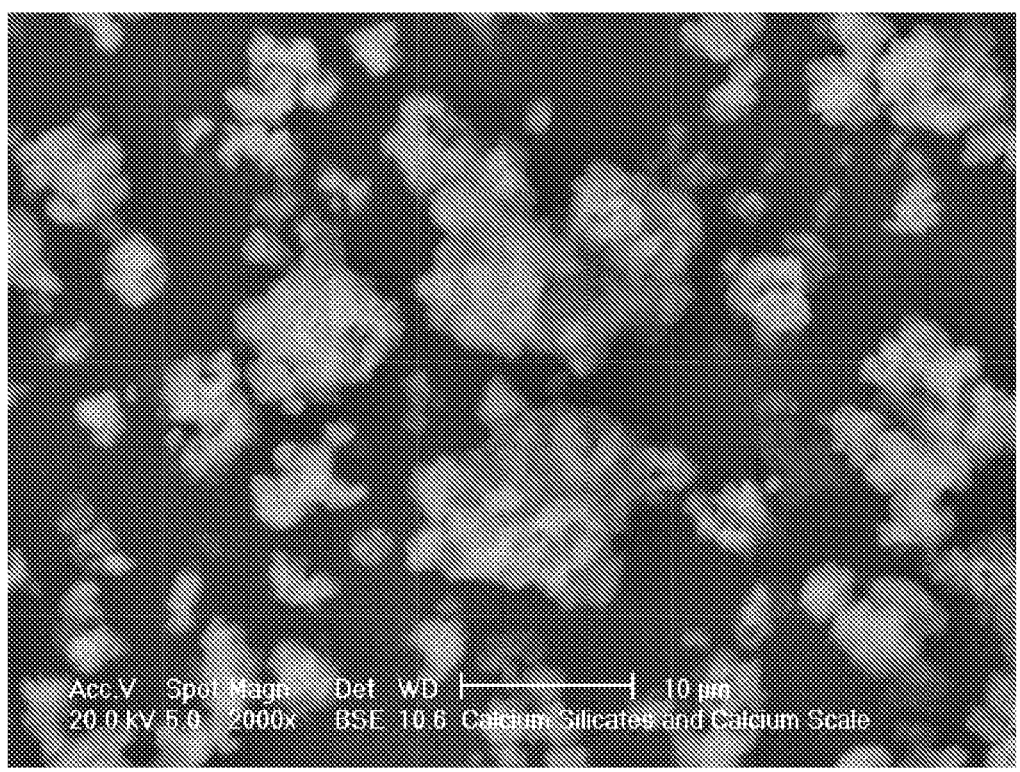
FIG. 12 is a scanning electron micrograph at 2000× magnification showing the co-precipitation of scale calcium carbonate with calcium silicate, with the addition of lime hydrate.

The addition of 0.5 g/L hydrated lime (Sample 9) also prevented scale formation. SEM revealed that the hydrated lime co-precipitated with calcium silicate to form a loose and fluffy phase that could adsorb scale seed crystals (FIG. 12).

Example 3

Varying amounts of Sample 2 and Sample 4 combined with natural hard water did not result in the formation of scale. Table 5 shows the results of experiments carried out in accordance with Example 2, in which the listed amounts of water were loaded with the listed amounts of Sample 2 or Sample 4, the listed amount of water was evaporated, and the amount of scaling was determined. Sample 2 prevented scale formation when added to the natural hard water at the low concentration of 0.05 g/L. SEM showed that the scale crystals were adsorbed to the Sample 2 particles (FIG. 8).

TABLE 5

| Sample ID | Water Volume (ml) | Loading (g) | Evaporated water (ml) | Scaling (%)* |
|---|---|---|---|---|
| Plant Water | 1000 | NA | 900 | 100 |
| Sample 2 | 1000 | 0.5 | 900 | 0 |
| Sample 2 | 1000 | 0.2 | 900 | 0 |
| Sample 2 | 2000 | 0.5 | 1800 | 0 |
| Sample 2 | 2000 | 0.25 | 1800 | 0 |
| Sample 2 | 1000 | 0.05 | 900 | 0 |
| Sample 4 | 1000 | 0.5 | 900 | 0 |
| Sample 4 | 1000 | 0.2 | 900 | 0 |

Example 4

The anti-scaling effects of Sample 2 were tested with polyvinyl chloride (PVC) and stainless steel surfaces, which represent exemplary surface materials of fluid handling systems, as well as Pyrex® glass (from Corning Incorporated). Table 6 shows the results of experiments conducted according to Example 2, in which the listed amounts of water were loaded with 0.05 g of Sample 2, the listed amount of water was evaporated, and the amount of scaling was determined. The anti-scaling effects of Sample 2 were independent of the system's surface and appeared to be dependent on Sample 2's intrinsic properties, including its surface affinity toward scale seed crystals, its non-adhesiveness to sample surfaces, and its high surface area (typically ~100 $m^2/g$) relative to that of equipment surfaces.

The scale adsorbed on the anti-scale material is loose and permeable. The scale crystals appear to be soft due to the capture or intergrowth of fine anti-scale particulates in the scale assembly. In other words, the scales formed in the presence of the anti-scale material are not as hard as would normally be expected.

TABLE 6

| Materials | Hard Water (ml) | Evaporated water (ml) | Scaling with Sample 2 (%) | Scaling without Sample 2 (%) |
|---|---|---|---|---|
| Cover Glass 305 | 1000 | 900 | 0 | 100 |
| Stainless Steel 316 | 1000 | 900 | 0 | 100 |
| Stainless Steel | 1000 | 900 | 0 | 100 |
| PVC | 1000 | 900 | 0 | 100 |
| Pyrex ® Glass | 1000 | 900 | 0 | 100 |

Despite concentrating the volume of the initial hard water (1200-1450 µS/cm) approximately ten times through boiling, no scale formation was observed on any tested surface when Sample 2 was added to the water (Table 6). Sample 2 also prevented corrosion on metal surfaces by adsorbing and interacting with corrosion-causing anions, such as $Cl^-$, $F^-$, $PO_4^{3-}$, $SO_4^{2-}$, from liquid and forming insoluble calcium salts, such as $(Ca)_3(PO_4)_2$, $CaSO_4$, $CaCl_2$, $CaF_2$, on the surfaces. In separate experiments similar to Example 2, metal cans were used to boil the natural hard water and it was shown that, without the addition of Sample 2 to the naturally hard water contained in the metal containers, not only did the metal surfaces exhibit scale formation but they also showed signs of corrosion due to rust caused by the high soluble salt contents in the liquid.

Example 5

This example illustrates the hardness, total dissolved solids, and alkalinity moderating effects of at least one anti-scale material according to the present description.

Plant water, as described in Example 1, was concentrated by heating to boiling in two 250-mL stainless steel beakers on heating plates. The control beaker contained plant water only, and the other beaker included 0.25 g/L of the anti-scale material, which was Sample 2 from Table 3 above. Due to vaporization loss of the water, the salt concentrations in the solutions in the beakers became more concentrated over time.

Additional plant water was continually added to offset vaporization loss of water, increasing the concentration of salts in the solution to saturation to cause scale to form. In addition, the plant water added to the anti-scale material-containing beaker included 0.25 g/L of the anti-scale material until a concentration of 35× was reached. From that point onward, plant water alone was added to both beakers. The concentration process was continued until the plant water had been concentrated approximately 80× by evaporation.

Scale started to form in the control beaker after about 5× concentration. In contrast, the beaker containing 0.25 g/L of the anti-scale material displayed no scale formation even up to a concentration of approximately 80× to 85×.

Figure 13:
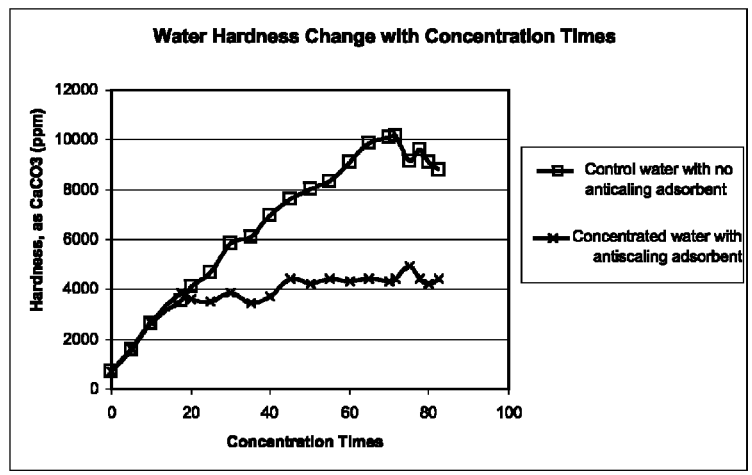
FIG. 13 is a graph showing the hardness of the control and particulate anti-scale containing samples of Example 5 as a function of increasing concentration.

Total dissolved solids, hardness, and alkalinity were periodically measured for both beakers. As shown in FIG. 13, the hardness of the control sample increased over time from an initial value of approximately 700 ppm to a maximum of approximately 9000 ppm at saturated conditions. In contrast, the hardness of the anti-scale material-containing sample appeared to reach a steady state value of approximately 4000 ppm. This suggests that addition of the anti-scale material has a moderating effect on maximum water hardness.

Figure 14:
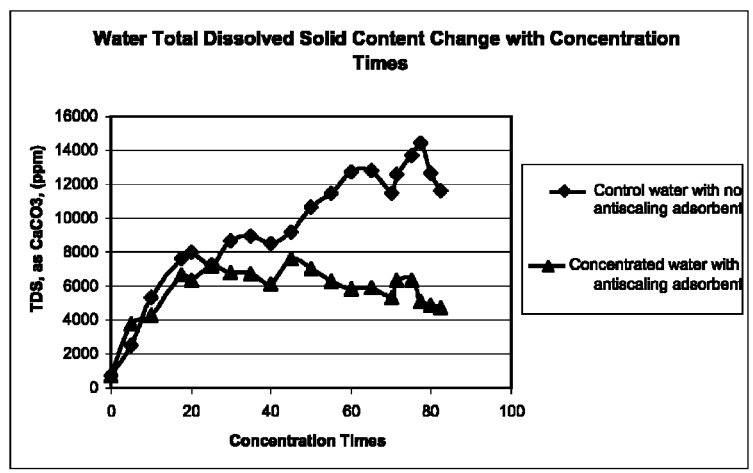
FIG. 14 is a graph showing the total dissolved solids of the control and particulate anti-scale containing samples of Example 5 as a function of increasing concentration.

As shown in FIG. 14, the total dissolved solids level also appear to be moderated by addition of the anti-scale material. For the control, maximum dissolved solids was reached at approximately 13,000 ppm, in comparison to a maximum dissolved solids level of approximately 7,000 ppm for the particulate anti-scale material-containing sample. This suggests that addition of the anti-scale material also has a moderating effect on total dissolved solids.

Figure 15:
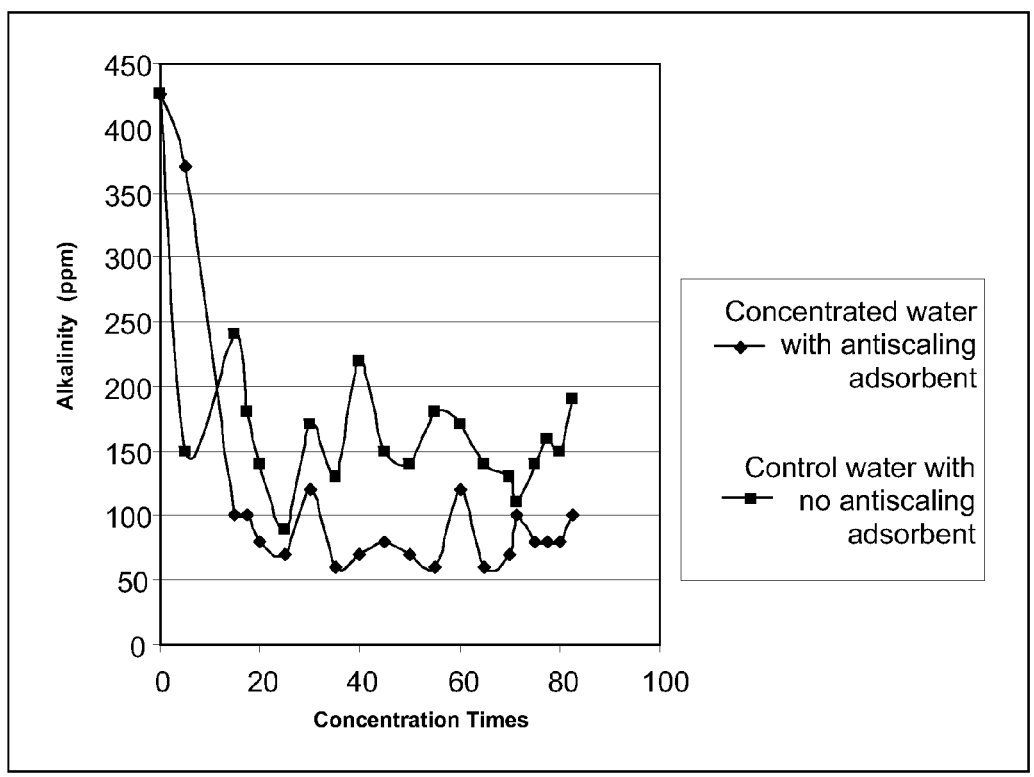
FIG. 15 is a graph showing the alkalinity of the control and particulate anti-scale containing samples of Example 5 as a function of increasing concentration.

The addition of the anti-scaling materials can also moderate the alkalinity. As shown in FIG. 15, addition of the anti-scale material also appears to have resulted in a lower steady state alkalinity. For the control sample, alkalinity rapidly decreased from an initial level of approximately 425 ppm to a steady state level ranging from about 100-200 ppm. In contrast, the anti-scale material containing sample dropped to a steady state alkalinity ranging from about 50 to about 100 ppm.

Without wishing to be bound by theory, it is possible that the particulate anti-scale adsorbent, with a high surface area and strong affinities to the scaling ions, acts as a buffer for water hardness, total dissolved solids, and alkalinity by acting as a nucleating agent to allow the scale forming salts to precipitate out of solution, so as to reduce the concentrations of the scale-forming species in the liquid under treatment. This is happening because the rate of scale precipitation on the anti-scalant powders compensates the increased rate of the scale-forming ions concentrations during water concentration due to evaporation. Thus, it is possible that the water hardness, total dissolved solids, and alkalinity in the treatment water can be maintained at a relatively low concentration level and which does not increase proportionally to the water concentration rate.

These results show that the anti-scale material may be particularly useful in water systems that involve evaporation loss or concentration of water, such as cooling tower and boilers. In addition to controlling scale formation on piping and equipment, the anti-scale material may also moderate the hardness and alkalinity of the concentrated water to relatively low levels. This may be useful in reducing water usage and waste water creation, and may even help to achieve zero liquid discharge (ZLD) in some systems.

Example 6

In this example, simulated oilfield brine water containing high concentrations of salts, including $Ca^{2+}$, $Mg^{2+}$, $Ba^{2+}$, $Sr^{2+}$, $Na^+$, $K^+$, $CO_3^{2-}$, $SO_4^{2-}$, $HCO_3^-$ and $Cl^-$, was used to assess the likely effectiveness of at least one anti-scale material of the present disclosure in oilfield applications. This example illustrates that the anti-scaling material can adsorb and disperse the scales formed when a cation-rich brine and an anion rich brine are mixed, similar to some oilfield scaling cases in which oilfield formation water and sea water are mixed and lead to scale formation.

The simulated brine water used in the experiments was made by combining a cation brine solution and an anion brine solution with compositions as shown in Table 7. The brine solutions were prepared with ACS-grade chemicals and de-ionized water.

TABLE 7

Compositions of Simulated Brine Solutions

| Compounds | Cation Brine (g/2 L) | Anion Brine (g/2 L) | Combined Simulating Brine | |
|---|---|---|---|---|
| | | | Ions | mg/L |
| NaCl | 63.3594 | 63.3322 | $Na^+$ | 13620 |
| KCl | 1.8095 | 1.8084 | $K^+$ | 474 |
| $CaCl_2 \cdot 2H_2O$ | 33.1819 | — | $Ca^{2+}$ | 2261 |
| $MgCl_2 \cdot 2H_2O$ | 27.9838 | — | $Mg^{2+}$ | 836 |
| $BaCl_2 \cdot 2H_2O$ | 0.8920 | — | $Ba^{2+}$ | 125 |
| $SrCl_2 \cdot 6H_2O$ | 2.4281 | — | $Sr^{2+}$ | 114 |
| $Na_2SO_4$ | — | 7.1627 | $SO_4^{2-}$ | 1210 |
| $NaHCO_3$ | — | 2.5550 | $HCO_3^-$ | 464 |
| | | | $Cl^-$ | 26240 |

The cation brine and the anion brine solutions were each made by dissolving the noted weights of chemical salts in deionized water. The two brine solutions were then combined at 1:1 ratio to obtain four liters of combined brine solution. Once combined, the combined brine solution quickly became turbid. After thorough mixing, 2 liters of the combined brine were separated for use as a control. The other 2 liters were immediately mixed with 0.2 g (0.1 g/L) of the anti-scale material, which was Sample 2 from Table 3 above.

The combined brine solutions were then concentrated by heating to boiling in two 250-mL Kimax beakers on heating plates. Due to vaporization loss of the water, the solutions in the beakers became more and more concentrated with the dissolved salts. Additional brine solution was continually added to offset vaporization loss of water, increasing the concentration of salts in the solution to saturation to cause scale to form. The scale samples examined in this study are obtained from the brines that were about 10 times concentrated by vaporization.

Several cover glass pieces were added in each beaker at the beginning of heating, to allow microscopic examination of the scale deposited thereon. After boiling/vaporization experiments, the cover glass were recovered from the beakers and the surfaces were gently rinsed by de-ionized water with a washing bottle, to wash off soluble salts, such as NaCl. The deposits or loose powders from the bottom of the beakers were also sampled for microscopic analysis. The samples were examined by a Phillip-Oxford SEM/EDS unit.

The control beaker, which held only the combined brine solution and without the addition of the anti-scale material, had significant scale formation. Scale was also formed in the beaker containing combined brine and 0.1 g/L of the anti-scale material, but the scale appeared to be effectively held in dispersed suspended form by the anti-scaling powders.

Figure 16:
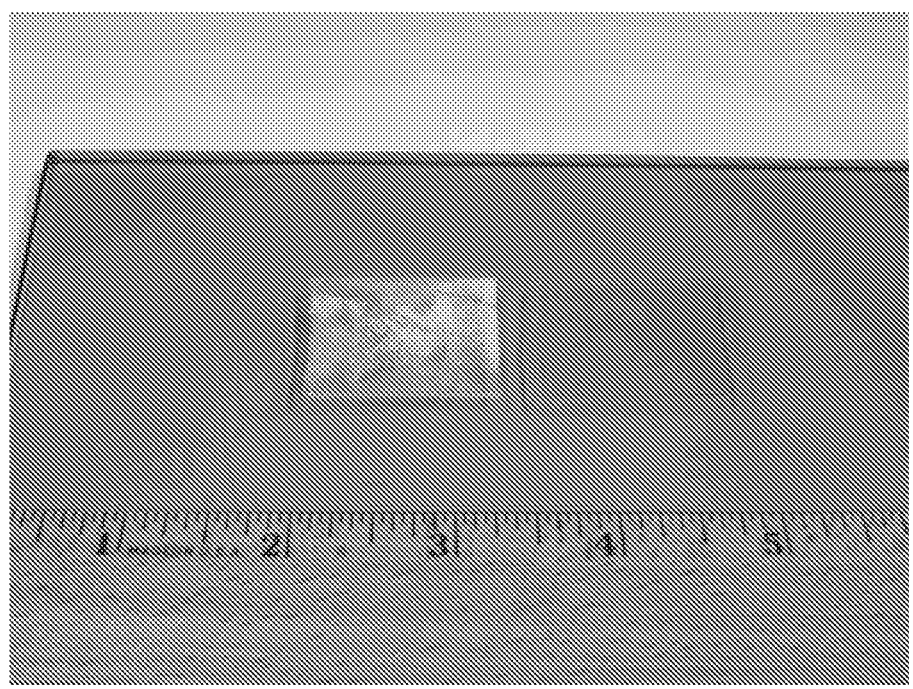
FIG. 16 is a photograph showing the relative scale accumulation on cover slides from the control and anti-scale material containing samples of Example 6.

As shown in FIG. 16, abundant scale crystals were also found formed on the cover glass from the control beaker containing only combined brine solution (left). In contrast, little to no scale formed on the cover glass from the beaker containing combined brine solution and 0.1 g/L of the anti-scale material (right).

Figure 17A:
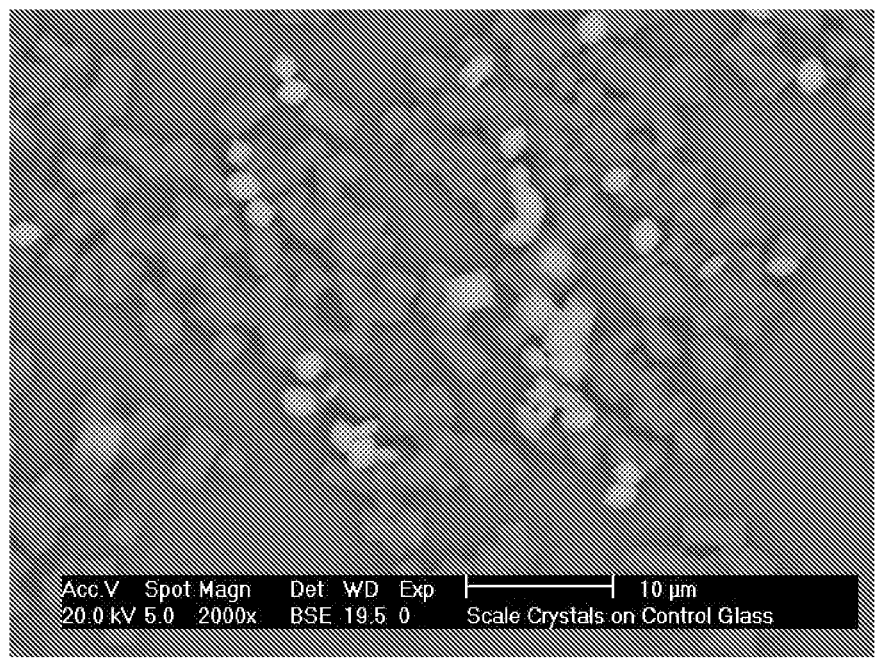
FIG. 17 (a) is a scanning electron micrograph at 2000× magnification showing the scale formed on a cover glass in the control sample of Example 6.
Figure 17B:
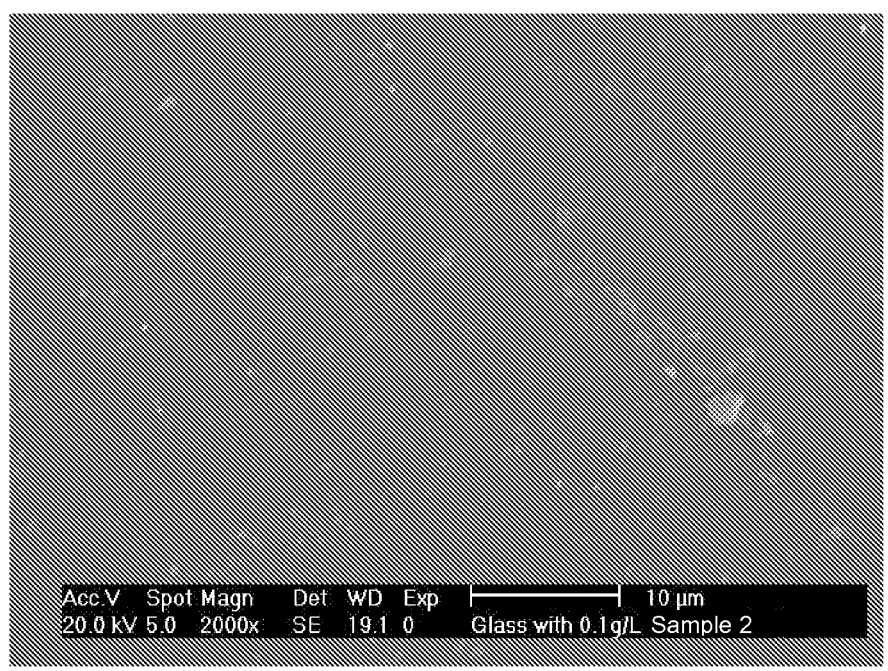

FIG. 17 (a) shows a close-up of scale crystals formed on a cover glass in the control beaker. The scales formed on the glass surface were mainly calcium carbonate scale (gray color) mixed with strontium and barium sulfates scale (light color). FIG. 17 (b) shows a close up of a cover glass from the beaker containing 0.1 g/L of the anti-scale material. There is little if any scale on the cover glass from the anti-scale containing sample.

With continuous boiling/vaporization to approximately 10× concentration, more precipitates formed in both beakers. The scale in the control beaker having only combined brine tended to form a layer of deposit on the bottom of the beaker. In contrast, the precipitated solids formed in the beaker with combined brine and 0.1 g/L of the anti-scale material formed as dispersed suspended particles.

Figure 18:
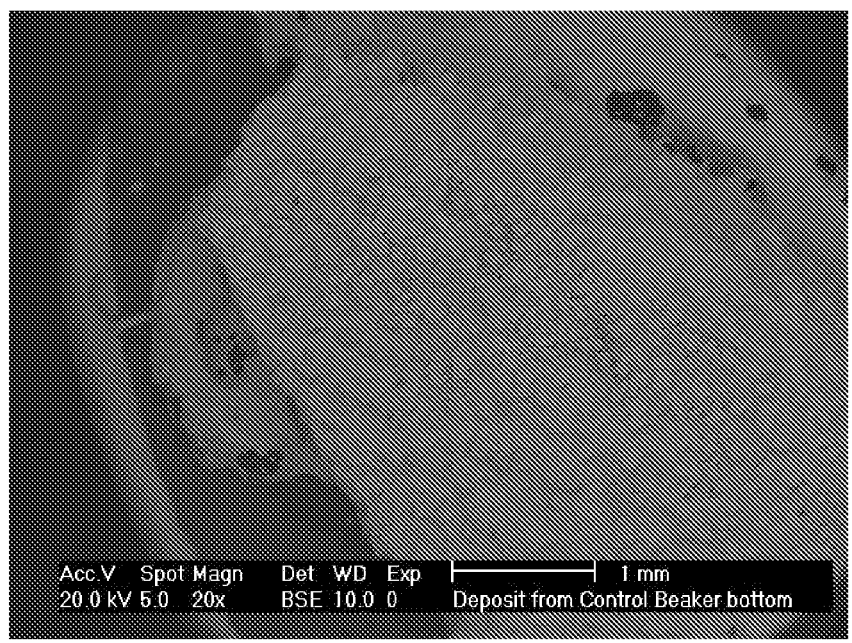
FIG. 18 is a scanning electron micrograph at 20× magnification showing a scale deposit from the control sample of Example 6.

Deposits from both beakers were also sampled and examined by SEM/EDS. As shown in FIG. 18, the scale deposits from the control beaker containing only combined brine consisted primarily of precipitated chloride salts (such as such as NaCl, KCl and $MgCl_2$) and calcium, strontium, and barium scales. In this FIG. 18, halites appear as large crystals embedded in the fine precipitates of KCl and $MgCl_2$.

Figure 19:
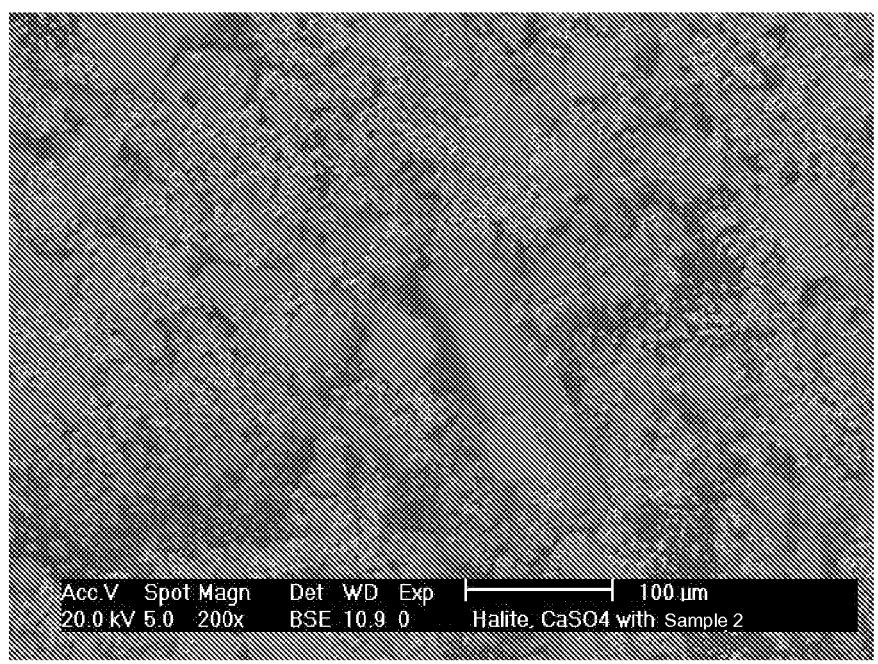
FIG. 19 is a scanning electron micrograph at 200× magnification showing loose scale from the particulate anti-scale containing sample of Example 6.
Figure 20:
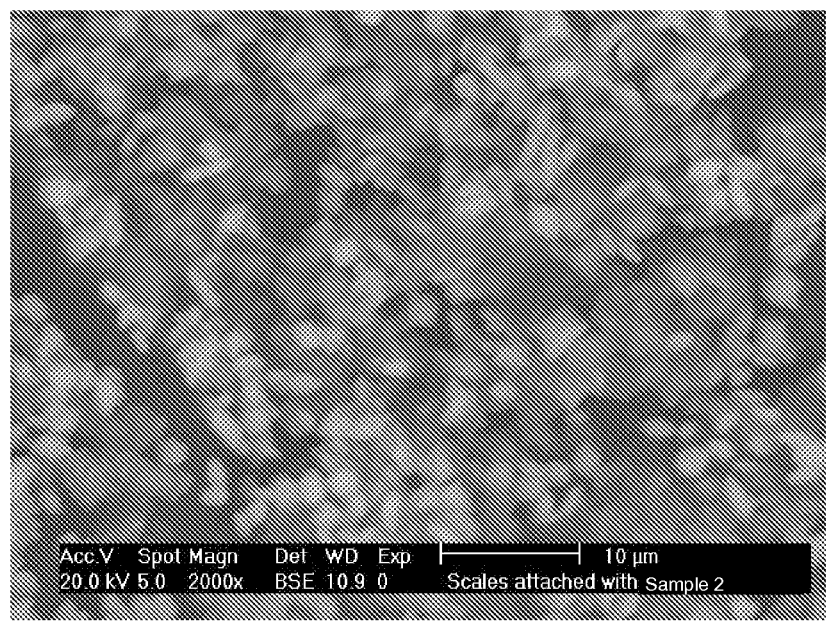
FIG. 20 is a scanning electron micrograph at 2000× magnification showing the attachment of scale particles to the anti-scale material in the particulate anti-scale containing sample of Example 6.

As shown in FIG. 19, the loose scale deposits from the beaker containing combined brine and 0.1 g/L of the anti-scale material exhibited large halite (NaCl) crystals, some calcium sulfate crystals, and abundant fine strontium, barium and calcium sulfate scale crystals attached with the anti-scale material. FIG. 20 is a close-up further illustrating the attachment of the scale crystals to the anti-scale material.

Based on the above data, the anti-scale material appears to effectively adsorb scale crystals of calcium carbonate, strontium sulfate, barium sulfate, calcium sulfate and silicate scales. Accordingly, one would also expect that the anti-scale material should be useful to reduce or control scale in applications involving fluids having high levels of these salts, such as for example use in oil-field drilling fluids.

What is claimed is:

1. A method of preventing or reducing scale formation or corrosion comprising combining at least one particulate scale-adsorbent agent with at least one scale-forming fluid comprising at least one scaling compound,
wherein the scale-adsorbent agent comprises a calcium silicate material.

2. The method of claim 1, wherein the calcium silicate material is a synthetic silicate material.

3. The method of claim 2, wherein the synthetic silicate material is derived from diatomaceous earth.

4. The method of claim 1, wherein the calcium silicate material is at least one glass.

5. The method of claim 4, wherein the at least one glass is selected from the group consisting of soda lime glass and calcium aluminosilicate glass.

6. The method of claim 1, wherein the at least one particulate scale-adsorbent agent is chosen from the group consisting of diatomaceous earth and wollastonite.

7. The method of claim 1, wherein the at least one particulate scale-adsorbent agent is added to the at least one scale-forming fluid in an amount ranging from about 0.01 g/L to about 20 g/L.

8. The method of claim 7, wherein the at least one particulate scale-adsorbent agent is added in an amount of about 0.05 g/L to about 0.5 g/L.

9. The method of claim 1, wherein the at least one particulate scale-adsorbent agent has a BET surface area of from about 5 to about 500 $m^2$/g.

10. The method of claim 9, wherein the at least one particulate scale-adsorbent agent has a BET surface area of from about 50 to about 200 $m^2$/g.

11. The method of claim 1, wherein the at least one anti-scale material has a median particle size ranging from about 1 to about 50 microns.

12. The method of claim 1, wherein the at least one scaling compound is at least one inorganic salt.

13. The method of claim 12, wherein the at least one inorganic salt is chosen from the group consisting of calcium carbonate, calcium sulfate, calcium oxalate, magnesium carbonate, calcium phosphate, barium carbonate, barium phosphate, and barium sulfate.

14. The method of claim 1, wherein the at least one scaling compound is at least one scale-forming ion.

15. The method of claim 14, wherein the at least one scale-forming ion is chosen from the group consisting of $Ca^{2+}$, $Mg^{2+}$, $Ba^{2+}$, $Sr^{2+}$, $Na^+$, $K^+$, $OH^-$, $NO_3^-$, $CO_3^{2-}$, $SO_4^{2-}$, $PO_4^{3-}$, $HPO_4^{2-}$, $H_2PO_4$, $C_2O_4^{2-}$, $SiO_3^{2-}$, $F^-$, and $Cl^-$.

16. The method of claim 1, wherein the at least one scaling compound is silica.

17. The method of claim 1, wherein the at least one scale-forming fluid is contained within at least one fluid handling system.

18. The method of claim 17, wherein the at least one fluid handling system is chosen from the group consisting of a boiler, an evaporator, a reactor, a cooling tower, a water system, a heat exchanger, a pipe, a filter, a membrane surface, and a secondary oil recovery unit.

19. The method of claim 18, wherein at least one surface of the at least one fluid handling system is made of a material chosen from the group consisting of plastic, glass, wood, and metal.

20. The method of claim 19, wherein the metal is stainless steel.

21. The method of claim 1, where the presence of the at least one anti-scale material moderates the hardness and/or alkalinity of the scale-forming liquid.

22. A method of preventing or reducing scale formation, comprising:
providing at least one scale-forming fluid comprising at least one scaling compound;
providing at least one particulate scale-adsorbent agent to the at least one scale-forming fluid; and
allowing the at least one scale-adsorbent agent to adsorb the at least one scaling compound,
wherein the scale-adsorbent agent comprises a calcium silicate material.

23. The method of claim 22, wherein the calcium silicate material is a synthetic silicate material.

24. The method of claim 22, wherein the at least one particulate scale-adsorbent material is chosen from the group consisting of diatomaceous earth and wollastonite.

25. The method of claim 22, wherein the at least one particulate scale-adsorbent agent is added in an amount ranging from about 0.01 g/L to about 2 g/L.

26. The method of claim 25, wherein the at least one particulate scale-adsorbent agent is added in an amount ranging from about 0.05 g/L to about 0.5 g/L.

27. The method of claim 22, wherein the at least one scaling compound is at least one inorganic salt.

28. The method of claim 27, wherein the at least one inorganic salt is chosen from the group consisting of calcium carbonate, calcium sulfate, calcium oxalate, magnesium carbonate, calcium phosphate, and barium sulfate.

29. The method of claim 22, wherein the at least one scaling compound is at least one scale-forming ion.

30. The method of claim 29, wherein the at least one scale-forming ion is chosen from the group consisting of $Ca^{2+}$, $Mg^{2+}$, $Ba^{2+}$, $Sr^{2+}$, $Na^+$, $K^+$, $OH^-$, $NO_3^-$, $CO_3^{2-}$, $SO_4^{2-}$, $PO_4^{3-}$, $HPO_4^{2-}$, $H_2PO_4^-$, $C_2O_4^{2-}$, $SiO_3^{2-}$, $F^-$, and $Cl^-$.

31. The method of claim 22, wherein the at least one scaling compound is silica.

32. The method of claim 22, wherein the at least one scale-forming fluid is provided within at least one fluid handling system.

33. The method of claim 32, wherein the at least one fluid handling system is chosen from the group consisting of a boiler, an evaporator, a reactor, a water system, a heat exchanger, a pipe, a filter, a membrane surface, a cooling tower, and a secondary oil recovery unit.

34. The method of claim 32, wherein a surface of the at least one fluid handling system is made of a material chosen from the group consisting of plastic, glass, and metal.

35. The method of claim 34, wherein the metal is stainless steel.

36. The method of claim 22, wherein the step of providing the at least one particulate scale-adsorbent agent comprises adding at least one particulate scale-adsorbent agent to the at least one scale-forming fluid.

37. The method of claim 22, wherein the step of providing the at least one particulate scale-adsorbent agent comprises:
providing at least one anti-scale precursor material to the at least one scale-forming fluid comprising at least one second scaling compound; and
co-precipitating the at least one scale co-precipitation agent with the at least one second scaling compound to form the at least one particulate scale-adsorbent agent.

38. The method of claim 37, wherein the at least one anti-scale precursor material is chosen from the group consisting of hydrated lime, sodium phosphate, and sodium silicate.

39. The method of claim 22, wherein the adsorbed at least one scaling compound is suspended in the at least one scaling fluid.

40. The method of claim 22, wherein the at least one particulate scale-adsorbent agent has a BET surface area of from about 5 to about 500 $m^2/g$.

41. The method of claim 40, wherein the at least one particulate scale-adsorbent agent has a BET surface area of from about 50 to about 200 $m^2/g$.

42. The method of claim 41, wherein the at least one particulate scale-adsorbent
agent has a BET surface area of from about 100 to about 200 $m^2/g$.

43. A method of preventing or reducing scale formation, comprising:
providing at least one scale-forming fluid comprising at least one scaling compound in the form of at least one scale crystal;
providing at least one particulate scale-adsorbent agent to the at least one scale-forming fluid; and
allowing the at least one scale-adsorbent agent to distort the at least one scale crystal and disperse the distorted crystal,
wherein the scale-adsorbent agent comprises a calcium silicate material.

44. The method of claim 43, wherein the particulate scale-adsorbent material is chosen from the group consisting of diatomaceous earth and wollastonite.

45. The method of claim 43, wherein the at least one particulate scale-adsorbent agent is added in an amount ranging from about 0.01 g/L to about 2 g/L.

46. The method of claim 43, wherein the at least one scaling compound is at least one inorganic salt.

47. The method of claim 46, wherein the at least one inorganic salt is chosen from the group consisting of calcium carbonate, calcium sulfate, calcium oxalate, magnesium carbonate, calcium phosphate, and barium sulfate.

48. The method of claim 43, wherein the at least one scaling compound is at least one scale-forming ion.

49. The method of claim 48, wherein the at least one scale-forming ion is chosen from the group consisting of $Ca^{2+}$, $Mg^{2+}$, $Ba^{2+}$, $Sr^{2+}$, $Na^+$, $K^+$, $OH^-$, $NO_3^-$, $CO_3^{2-}$, $SO_4^{2-}$, $PO_4^{3-}$, $HPO_4^{2-}$, $H_2PO_4$, $C_2O_4^{2-}$, $SiO_3^{2-}$, $F^-$, and $Cl^-$.

50. The method of claim 43, wherein the at least one scaling compound is silica.

* * * * *

UNITED STATES PATENT AND TRADEMARK OFFICE
CERTIFICATE OF CORRECTION

PATENT NO. : 8,623,273 B2  Page 1 of 1
APPLICATION NO. : 12/995021
DATED : January 7, 2014
INVENTOR(S) : Lu It is certified that error appears in the above-identified patent and that said Letters Patent is hereby corrected as shown below:

In the Claims:

Claim 15, col. 20, line 30, "$H_2PO_4$" should read -- $H_2PO_4^-$ --.

Claim 49, col. 22, line 43, "$H_2PO_4$" should read -- $H_2PO_4^-$ --.

Signed and Sealed this
Twenty-ninth Day of April, 2014

Michelle K. Lee
*Deputy Director of the United States Patent and Trademark Office*